United States Patent [19]
Gandolfi et al.

[11] 3,862,979
[45] Jan. 28, 1975

[54] 9-DESOXY-PROSTA-5,9(10),13-TRIENOIC ACID DERIVATIVES

[75] Inventors: Carmelo Gandolfi; Gianfederico Doria, both of Milan; Pietro Gaio, Belluno, all of Italy

[73] Assignee: Carlo Erba S.P.A., Milan, Italy

[22] Filed: June 4, 1973

[21] Appl. No.: 366,978

[30] Foreign Application Priority Data
June 15, 1972  Italy.................................. 25672/72
Apr. 17, 1973  Italy.................................. 23086/73

[52] U.S. Cl........... 260/514 D, 260/338, 260/345.9, 260/345.8, 260/448 R, 260/448.8 R, 260/468D, 260/488 J, 260/468 K, 260/488 R, 260/501.1, 260/514 J, 260/514 K, 260/520, 260/598, 260/473 A, 424/305, 424/317

[51] Int. Cl............................................. C07c 61/32
[58] Field of Search................... 260/468 D, 514 D

[56] References Cited
UNITED STATES PATENTS
3,728,382   4/1973   Bundy................................ 260/514

OTHER PUBLICATIONS
Foss et al., Biochemistry, II 2271 (1972).

*Primary Examiner*—Robert Gerstl
*Attorney, Agent, or Firm*—Cushman, Darby & Cushman

[57] ABSTRACT

This invention relates to 9-desoxy-prosta-5,9 (10), 13-trienoic acid derivatives, to processes for making them and to pharmaceutical compositions containing them.

4 Claims, No Drawings

9-DESOXY-PROSTA-5,9(10),13-TRIENOIC ACID DERIVATIVES

The compounds of the invention are those of general formula (1)

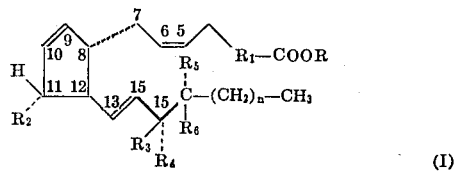

(I)

and the racemates thereof, wherein R is a hydrogen atom, a pharmaceutically acceptable cation or a $C_{1-12}$ alkyl group; $R_1$ is —$CH_2$—$CH_2$—, —$OCH_2$—, —CH=CH— or C≡C—; $R_2$ is a hydrogen atom, a hydroxy group or an acyloxy group; one of $R_3$ and $R_4$ is a hydroxy group and the other is a hydrogen atom or a $C_{1-6}$ alkyl or a $C_2$—$C_6$ alkenyl group or, when $R_2$ is a hydrogen atom, both $R_3$ and $R_4$ are hydrogen atoms; $R_5$ and $R_6$, which may be the same or different, are a hydrogen atom or A $C_{1-4}$ alkyl group; $n$ is 3, 4 or 5.

The double bond in the 5(6)-position is a cis-double bond. The double bond in the 13(14)-position is a trans-double bond.

When $R_1$ is —CH=CH—, it may be either cis—CH=CH— or trans—CH=CH—.

The alkyl and alkenyl groups may be branched or unbranched. When one of $R_3$ and $R_4$ is a $C_{1-6}$ alkyl group, it is preferably methyl, ethyl, propyl or isopropyl. When one of $R_3$ and $R_4$ is a $C_{2-6}$ alkenyl group, it is preferably vinyl. When $R_2$ is an acyloxy group, it is preferably a $C_{1-6}$ aliphatic acyloxy group, in particular an acetoxy or propionyloxy group.

In the formulae of this specification the broken lines indicate that the substituents are in the α-configuration, i.e. are below the plane of the ring or, respectively, of the chain.

The wavy line attachment ($\xi$) indicates that the substituents are in the α-configuration, i.e. below the plane of the ring, or of the chain, or in the β-configuration, i.e. above the plane of the ring or of the chain.

As is evident from formula (1), when one of $R_3$ and $R_4$ is a hydroxy group, this hydroxy group may be either in the α-configuration

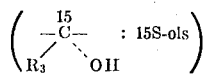

or in the β-configuration

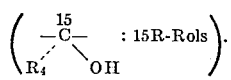

Preferred compounds of the invention are those wherein $R_1$ is —$CH_2$—$CH_2$— or —$OCH_2$—.

Examples of specific compounds of the invention are:
5C,13t-prosta-5,9,13-trienoic acid;
5c,13t-3-oxa-prosta-5,9,13-trienoic acid;
5c,13t-16R-methyl-prosta-5,9,13-trienoic acid;
5c,13t-16S-methyl-prosta-5,9,13-trienoic acid;
5c,13t-16,16-dimethyl-prosta-5,9,13-trienoic acid;
5c,13t-11α,15S-dihydroxy-prosta-5,9,13-trienoic acid;
5c,13t-11α,15S-dihydroxy-16R-methyl-prosta-5,9,13-trienoic acid;
5c,13t-11α,15S-dihydroxy-16S-methyl-prosta-5,9,13-trienoic acid;
5c,13t-11α,15S-dihydroxy-16,16-dimethyl-prosta-5,9,13-trienoic acid;
5c,13t-11α,15S-dihydroxy-20ω-homo-prosta-5,9,13-trienoic acid;
5c,13t-11α,15S-dihydroxy-20ω-dihomo-prosta-5,9,13-trienoic acid;
5c,13t-11α,15S-dihydroxy-15R-methyl-prosta-5,9,13-trienoic acid;
5c,13t-11α,15S-dihydroxy-15R-vinyl-prosta-5,9,13-trienoic acid;
5c,13t-11α,15R-dihydroxy-prosta-5,9,13-trienoic acid;
5c,13t-11α,15R-dihydroxy-16R-methyl-prosta-5,9,13-trienoic acid;
5c,13t-11α,15R-dihydroxy-16S-methyl-prosta-5,9,13-trienoic acid;
5c,13t-11α,15R-dihydroxy-16,16-dimethyl-prosta-5,9,13-trienoic acid;
5c,13t-11α,15R-dihydroxy-20ω-homo-prosta-5,9,13-trienoic acid;
5c,13t-11α,15R-dihydroxy-20ω-dihomo-prosta-5,9,13-trienoic acid;
5c,13t-11α,15S-methyl-prosta-5,9,13-trienoic acid;
5c,13t-11α,15R-dihydroxy-15S-vinyl-prosta-5,9,13-trienoic acid;
5c,13t-11α,15S-dihydroxy-16S-isopropyl-prosta-5,9,13-trienoic acid;
5c,13t-11α,15R-dihydroxy-16R-isopropyl-prosta-5,9,13-trienoic acid;
5c,13t-11α,15S-dihydroxy-3-oxa-prosta-5,9,13-trienoic acid;
5c,13t-11α,15S-dihydroxy-16,16-dimethyl-3-oxa-prosta-5,9,13-trienoic acid;
5c,13t-11α,15R-dihydroxy-3-oxa-prosta-5,9,13-trienoic acid;
5c,13t-11α,15R-dihydroxy-16,16-dimethyl-3-oxa-prosta-5,9,13-trienoic acid;
either as free acids or as their methylesters.

The ω-homo-compounds are those wherein $n$ is 4.
The ω-dihomo-compounds are those wherein $n$ is 5.

The compounds of the invention may be prepared:
a. converting an optically active or racemic compound of formula (11)

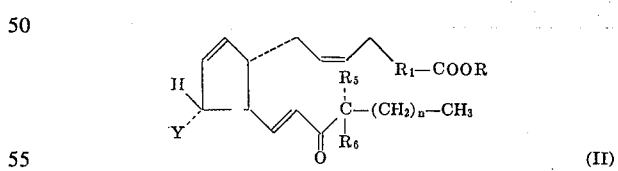

(II)

wherein R, $R_1$, $R_5$, $R_6$ and n are as defined above and Y is a hydroxy or an acyloxy group or a known protecting group bound to the ring by an ethereal oxygen atom, into a mixture of a compound of formula (111a)

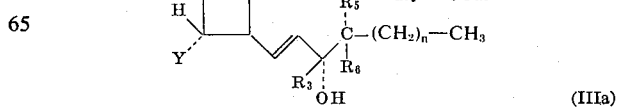

(IIIa)

wherein R, $R_1$, $R_5$, $R_6$, Y and $n$ are as defined above and wherein $R_3$ is a hydrogen atom or a $C_{1-6}$ alkyl or $C_{2-6}$ alkenyl group (15S-ol) and of a compound of formula (IIIb)

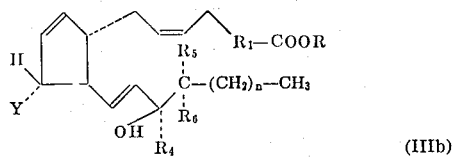

(IIIb)

wherein R, $R_1$, $R_5$, $R_6$, Y and $n$ are as defined above and wherein $R_4$ is a hydrogen atom or a $C_{1-6}$ alkyl or $C_{2-6}$ alkenyl group (15R-ol), which mixture may be, in any order, separated and, when Y is a known protection group as defined above, deetherified and, if desired, when Y and/or R is an acyloxy group, saponified and, if desired, reacting a compound of formula (1) wherein $R_1$, $R_5$, $R_6$ and $n$ are as defined above, $R_2$ is a hydroxy group, one of $R_3$ and $R_4$ is a hydroxy group and the other is a hydrogen atom and R is a $C_{1-12}$ alkyl group, or a corresponding mixture of the 15S- and 15R-ol, with a reactive derivative of a sulphonic acid to give a compound of formula (IV)

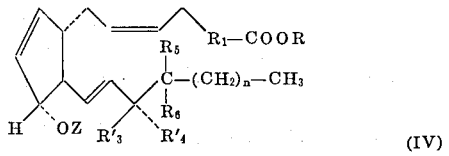

(IV)

wherein $R_1$, $R_5$, $R_6$ and $n$ are as defined above, R is a $C_{1-12}$ alkyl group, Z is a sulphonic acid residue and one of $R'_3$ and $R'_4$ is —OZ while the other is a hydrogen atom or a corresponding mixture of the 15S- and 15R-derivative, which is then reacted with a reducing agent to give a compound of formula (V)

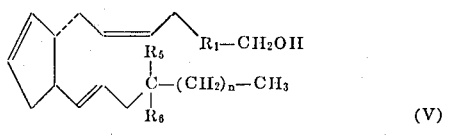

(V)

wherein $R_1$, $R_5$, $R_6$ and $n$ are as defined above, which is oxidized to give a compound of formula (1) wherein $R_1$, $R_5$, $R_6$ and $n$ are as defined above and R, $R_2$, $R_3$ and $R_4$ are hydrogen atoms; or b. reacting an optically active or racemic compound of formula (VI)

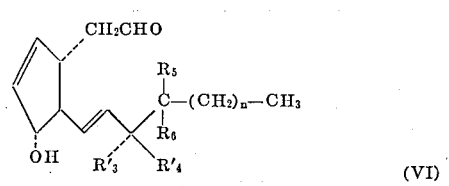

(VI)

wherein $R_5$, $R_6$ and $n$ are as defined above, one of $R'_3$ and $R'_4$ is a hydroxy group or a known protecting group bound to the chain by an ethereal oxygen atom and the other is a hydrogen atom, a $C_{1-6}$ alkyl or $C_{2-6}$ alkenyl group, or a corresponding mixture of the 15S- and 15R-derivative, with a Wittig reagent comprising the group —$CH_2$—$CH_2$—$R_1$—COOR wherein $R_1$ is as defined above and R is a hydrogen atom or a $C_{1-12}$ alkyl group, to give a compound of formula (VII)

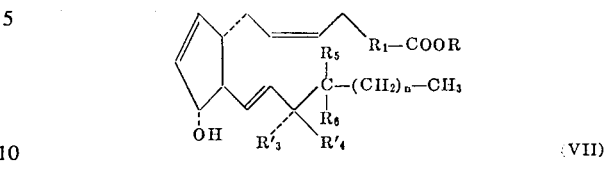

(VII)

wherein R, $R_1$, $R'_3$, $R'_4$, $R_5$, $R_6$ and $n$ are as defined above, or a corresponding mixture of the 15S- and 15R-derivative, which in any order, may be, if necessary, separated and/or, when one of $R'_3$ and $R'_4$ is a known protecting group as defined above, acylated in the 11-position and, when one of $R'_3$ and $R'_4$ is a known protecting group as defined above, deetherified and then optionally reacting a compound of formula (1) wherein $R_1$, $R_5$, $R_6$ and $n$ are as defined above, $R_2$ is an hydroxy group, one of $R_3$ and $R_4$ is hydroxy group and the other is a hydrogen atom and R is a $C_{1-12}$ alkyl group, or a corresponding mixture of the 15S- and 15R-ol, with a reactive derivative of a sulphonic acid, to give a compound of formula (IV), or a corresponding mixture of the 15 S- and 15R-derivative, which is then reduced to a compound of formula (V) which is finally oxidized to give a compound of formula (1) wherein R, $R_2$, $R_3$ and $R_4$ are hydrogen atoms.

The compounds of formulas (IIIa),(IIIb), (IV), (V), (VI) and (VII) may be either optically active or racemic compounds.

Compounds wherein R is a hydrogen atom, can be esterified or reacted with a pharmaceutically acceptable base to give compounds wherein R is, respectively, a $C_{1-12}$ alkyl group or a pharmaceutically acceptable cation.

Examples of pharmaceutically acceptable cations are either metallic cations, such as sodium, potassium, calcium, aluminum and the like, or organic amine cations such as, e.g., trialkylamines.

Compounds wherein R is a $C_{1-12}$ alkyl group can be hydrolysed to give those wherein R is a hydrogen atom.

The known protecting groups (i.e. ether groups) should be convertible to hydroxy groups under mild reaction conditions, e.g. acid hydrolysis. Examples are acetalic ethers, enolethers and silylethers. The preferred groups are

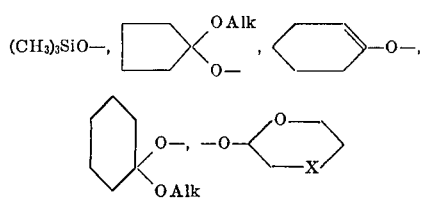

wherein X is —O— and —$CH_2$—, and Alk is a lower alkyl group.

In the compounds of formula (II) the acyloxy group may be either an aliphatic or an aromatic acyloxy group. It may be suitably a $C_{1-6}$ aliphatic acyloxy group.

The conversion of a compound of formula (II) into a mixture of a compound of formula (IIIa) wherein $R_3$ is a hydrogen atom and of a compound of formula (IIIb) wherein $R_4$ is a hydrogen atom, may be effected by reduction with for example a reducing agent such as sodium, lithium or zinc borohydride in a solvent which is preferably diethyl ether, dimethoxyethane, dioxan, benzene or their mixtures.

The conversion of a compound of formula (II) into a mixture of a compound of formula (IIIa) wherein $R_3$ is a $C_{1-6}$ alkyl or $C_{2-6}$ alkenyl group and of a compound of formula (IIIb) wherein $R_4$ is a $C_{1-6}$ alkyl or $C_{2-6}$ alkenyl group may be effected by reaction with a Grignard reagent, e.g. an alkyl or alkenyl magnesium halide.

The optional separation of the 15S- and 15R-ols from each other may be carried out for example by chromatographic techniques, preferably column chromatography, e.g. on acid washed silica.

Deetherification is performed under conditions of mild acid hydrolysis, for example with mono- or polycarboxy acids e.g. formic, acetic, oxalic, citric and tartaric acid, and in a solvent, for example water, acetone, tetrahydrofuran, dimethoxyethane and lower aliphatic alcohols.

Preferably, 0.1N to 0.25N polycarboxylic acid (e.g. oxalic or citric acid) is used in the presence of a convenient low boiling co-solvent which is miscible with water and which can be easily removed in vacuo at the end of the reaction.

The optional saponification may, if desired, be selective. In fact, by treatment of compounds wherein R is a $C_{1-12}$ alkyl group and Y is an acyloxy group with an alkali such as NaOH or KOH in an aliphatic alcohol, preferably a low molecular weight alcohol, compounds wherein R is a hydrogen atom and Y is a hydroxy group are obtained.

When the saponification is carried out with an alkali metal carbonate or bicarbonate in dry methanol, compounds wherein R is a $C_{1-12}$ alkyl group and Y is a hydroxy group are obtained.

The reaction with the reactive derivative of a sulphonic acid is suitably performed in the presence of a base, for example pyridine, collidine or a trialkylamine.

As reactive derivative of a sulphonic acid may be used, for example, a halide, e.g. a chloride. The sulphonic acid may be, for example, p-toluenesulphonic acid or methanesulphonic acid.

The conversion of a compound of formula (IV) into a compound of formula (V) may be carried out, for example, using lithium aluminum hydride in a solvent which is, for example, acetone, diethyl ether, dimethoxyethane, dioxane, benzene or their mixtures.

The subsequent oxidation may be preferably carried out with for example, Jones reagent, at temperature preferably ranging between −15° and +5°C.

In the compounds of formula (VI) the 11-hydroxy group may be free or protected in conventional manner, for example by an acyl group or by the formation of an ether. The removal of the protecting groups can be carried out by the usual methods of organic chemistry, as is known to those skilled in the art.

The Wittig reaction is suitably carried out using at least one mole, preferably 2–10 moles of the Wittig reagent per mole of aldehyde.

The reaction is generally performed in an organic solvent, for example dimethylsulphoxide (DMSO), tetrahydrofuran (THF), dimethylformamide (DMF), hexamethylphosphoramide (HMTP), diethylether, benzene or their mixtures in the presence of a base, preferably methylsulphinyl carbanion, potassium tert-butoxide, at 0° to the reflux temperature of the reaction mixture, preferably at room temperature or below.

The reaction can take a few minutes to several days depending on the temperature and concentration of the reaction mixture and the specific Wittig reagent used.

The term "Wittig reagent" includes compounds of general formula $(Aryl)_3P^+-CH_2CH_2-R_1-COOR\ Hal^-$ wherein Hal is bromo or chloro and R and $R_1$ are as defined above.

Other phosphorus derivatives, e.g. the diethylaryl derivatives are also included.

The preparation of these reagents is discussed in detail by Tripett, Quart. Rev. 1963, XVII, No. 4, 406. The optional acylation to give compounds wherein $R_2$ is an acyloxy group may be carried out by reaction with a reactive derivative of the appropriate carboxylic acid, e.g. a halide or a mixed anhydride in the presence of a tertiary base.

The deetherification and the reaction with a sulphonic acid derivative, as well as the conversion of compounds of formula (IV) into compounds of formula (V) and the subsequent reduction and oxidation may be carried out as stated above.

The compounds of general formula (11) may be prepared in turn, by means of a multi-step process using as starting material an optically active or racemic compound of formula (VIII)

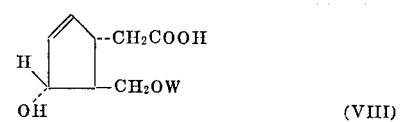

(VIII)

wherein W is an aralkyl group, preferably a benzyl group. The compound of formula (VIII) may be prepared as described by Corey et al., J. Am. Chem. Soc., 1971, 93, 1491. The multi-step process to obtain the compound of general formula (II) involves the following steps:

1. esterification of a compound of formula (VIII) to give a compound of formula (IX)

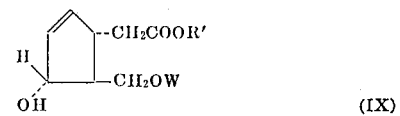

(IX)

wherein W is as defined above and R' is a $C_{1-12}$ alkyl group. The esterification is carried out according to the usual methods of organic chemistry, for example, by reaction with a diazoalkane, or by reaction with a suitable alcohol;

2. etherification of a compound of formula (IX) to give a compound of formula (X)

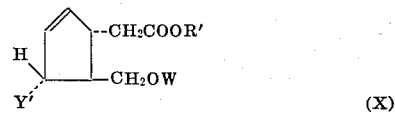

(X)

wherein W and R' are as defined above and Y' is a known protecting group bound to the ring by an ethereal oxygen atom.

The etherification is preferably carried out with a vinylic ether of formula

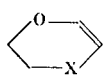

wherein X is —O— or —CH$_2$—, in the presence of catalytic amounts of for example phosphorus oxychloride, p-toluenesulphonic acid or benzene sulphonic acid, or with a silyl ether, for instance by reacting a trisubsituted chlorosilane, in the presence of an acceptor base (for example, a trialkylamine) of the hydrogen halide formed, or with an enol ether, for instance by reaction, in presence of an acid catalyst, with a cyclopentanone or cyclohexanone diacetal, at the reflux temperature in an inert solvent, and distilling the alcohol formed to obtain mixed acetals or enol ethers, according to the quantity of catalyst used or the heating time;

3. reduction of a compound of formula (X) to give a compound of formula (XI)

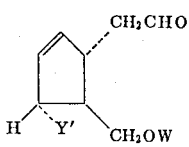 (XI)

wherein Y' and W are as defined above. the reduction may be carried out for example using as reducing agent diisobutyl aluminium hydride in an inert solvent, for example toluene, n-heptane, n-hexane or benzene or their mixtures, at below —30°C;

4. reaction of a compound of general formula (XI) with a Wittig reagent comprising the group —CH$_2$—CH$_2$—R$_1$—COOR, wherein R$_1$ is as defined above and R is a hydrogen atom or a C$_{1-12}$ alkyl group, to give a compound of general formula (XII)

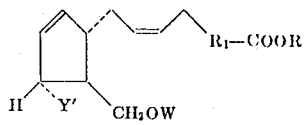 (XII)

wherein R, R$_1$, Y' and W are as defined above. The Wittig reaction is carried out as already described above;

5. optional conversion of the compound of formula (XII) to give a compound of formula (XIII)

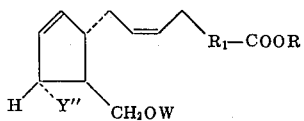 (XIII)

wherein R, R$_1$ and W are as defined above and 4'' is an acyloxy group, preferably a C$_{1-6}$ aliphatic acyloxy group.

The conversion is carried out by deetherification and subsequent acylation.

The deetherification may be performed as described above under conditions of mild acid hydrolysis, for example, with oxalic acid in acetone. The acylation may be performed by reaction with a reactive derivative of the appropriate acid, e.g. a halide or a mixed anhydride in presence of a tertiary base;

6. conversion of a compound of formula (XIV)

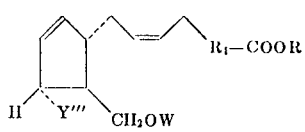 (XIV)

wherein R, R$_1$ and W are as defined above and Y''' is an acyloxy group or a known protecting group as defined above, into a compound of formula (XV)

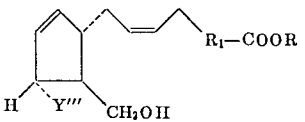 (XV)

wherein R, R$_1$ and Y''' are as defined above. When, in the compound of formula (XIV), R is a hydrogen atom, the conversion is preferably carried out with sodium in a convenient alcohol, e.g. ethanol, n-propanol, at the reflux temperature.

When, in the compound of formula (XIV), R is a C$_{1-12}$ alkyl group, the conversion is preferably performed with lithium, sodium or calcium in liquid ammonia in presence of a co-solvent selected from the group consisting of dimethoxy ethane, tetrahydrofuran, diethyl ether;

7. oxidation of a compound of formula (XV) to give a compound of formula (XVI)

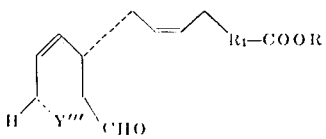 (XVI)

wherein R, R$_1$ and Y''' are as defined above. The oxidation may be carried out for example by reaction in an organic solvent, e.g. methylene chloride, with chromic anhydride in presence of pyridine;

8. reaction of a compound of formula (XVI) with an alkali or alkaline earth metal salt of a compound of general formula (XVII)

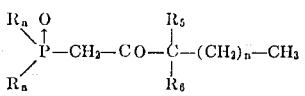 (XVII)

wherein R$_5$, R$_6$ and $n$ are as defined above, and each of the groups R$_a$, which may be the same or different, is a lower alkyl group, to give a compound of formula (XVIII)

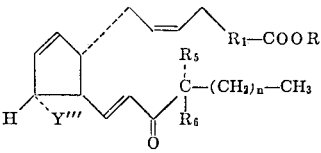 (XVIII)

wherein R, R$_1$, Y''', R$_5$, R$_6$ and $n$ are as defined above. The reaction is suitably performed in a solvent which is preferably dry dimethoxyethane, tetrahydrofuran or benzene or their mixtures, and using a suspension of an alkali or alkaline earth metal salt of the compound of general formula (XVII) in this solvent. The compound of general formula (XVII) may be prepared by reacting a phosphonate of the formula

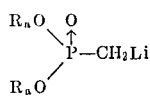

wherein $R_a$ is as defined above, with an ester of formula

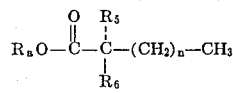

wherein $R_a$, $R_5$, $R_6$ and $n$ are as defined above, according to Corey and Kwiatkowski, 1966, J. Am. Chem. Soc. 88, 5654, (10).

9. optional deetherification or saponification of the compound of formula (XVIII) to give a compound having the free 11-hydroxy group.

The deetherification and the saponification, which, if desired, is selective, may be carried out as already described above.

All the compounds of formulae (IX) to (XVIII) may be either optically active or racemic compounds.

The compounds of general formula (VI) may be prepared in turn, by means of a multi-step process using as starting material an optically active or racemic compound of formula (VIII).

The multi-step process to obtain the compound of formula (VI) involves the following steps:

1. esterification of a compound of formula (VIII) to give a compound of formula (XIX)

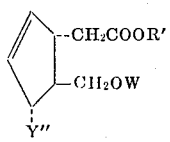

(XIX)

wherein R' is a $C_{1-12}$ alkyl, Y'' is an acyloxy group, preferably an aliphatic $C_{1-6}$ acyloxy group and W is an aralkyl group, preferably benzyl group.

Y'' may be also, for example, a p-phenylbenzoyloxy or a benzoyloxy radical.

The esterification may be carried out by the usual methods of organic chemistry;

2. conversion of a compound of formula (XIX) to give a compound of formula (XX)

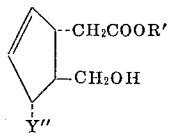

(XX)

wherein R' and Y'' are as defined above.

The conversion may be carried out by treatment of the compound of formula (XIX) with a halogenating agent, such as chloro, bromo, bromodioxane, pyridine hydrotribromide, pyrrolidone hydrotribromide, preferably at room temperature, in a solvent preferably selected from the group consisting of methylene chloride, carbon tetrachloride, dioxane, benzene, tetrahydrofuran, pyridine or their mixtures, so obtaining a compound of formula

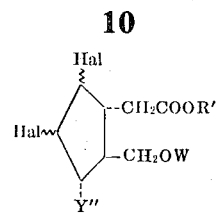

wherein R' and Y'' are as defined above, which is then converted into a compound of formula

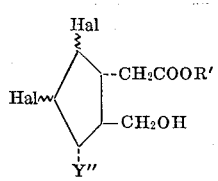

wherein R' and Y'' are as defined above, by reaction with, for example, at least a mole of a bromotrihalide, e.g. $BJ_3$, $BBr_3$, $BCl_3$, in a solvent such as methylene chloride, carbon tetrachloride or their mixtures at a temperature preferably ranging between −78° and +25°C, from which, by reductive dehalogenation, with for example zinc in presence of catalytic amounts of acetic acid, chromous chloride, chromous acetate, sodium iodide in acetone, it is obtained the compound of formula (XX).

This three-step process is preferably carried out without isolation of intermediates, so obtaining higher yields;

3. oxidation of a compound of formula (XX) to give a compound of formula (XXI)

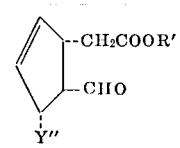

(XXI)

wherein R' and Y'' are as defined above.

The oxidation may be performed for example in dimethyl sulphoxide using carbodiimide, for example dicyclohexyl-carbodiimide, in presence of a suitable protonating agent, e.g. orthophosphoric acid or pyridine trifluoroacetate, or if desired by means of a modified Collins reagent (Ratcliffe,Rodehorst, 1970, J. Org. Chem. 35, 400);

4. reaction of the aldehyde of formula (XXI) with an alkali or alkaline earth metal salt of a compound of formula (XVII) wherein $R_a$, $R_5$, $R_6$ are as defined above to give a compound of formula (XXII)

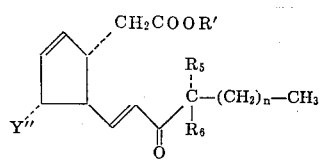

(XXII)

wherein R', Y'', $R_5$, $R_6$ and $n$ are as defined above. The reaction is performed as already described above.

5. conversion of a compound of formula (XXII) into a mixture of a compound of formula (XXIIIa)

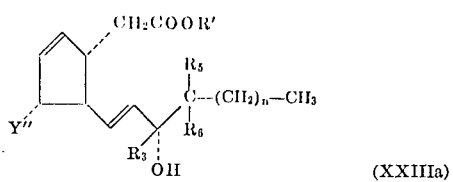

(XXIIIa)

wherein R', Y'', $R_5$, $R_6$ and $n$ are as defined above and wherein $R_3$ is a hydrogen atom ar a $C_{1-6}$ alkyl or $C_{2-6}$ alkenyl group (15S-Ol) and of a compound of formula (XXIIIb)

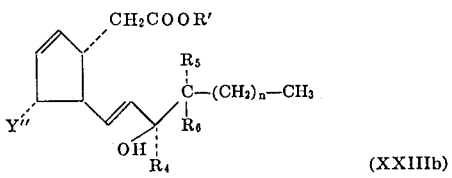

(XXIIIb)

wherein R', Y'', $R_5$, $R_6$ and $n$ are as defined above and wherein $R_4$ is a hydrogen atom or a $C_{1-6}$ alkyl or $C_{2-6}$ alkenyl group (15R-0l).

As already described above the conversion may be effected by treatment with a reducing agent or respectively by reaction with a Grignard reagent, depending from the compounds which are desired to be obtained;

6. optional separation of the 15S-0l from the 15R-0l, for example by chromatographic techniques, preferably column chromatography:

7. etherification of the 15S-0l or of the 15R-0l or of a mixture of the 15S- and 15R-0l to give a compound of formula (XXIV)

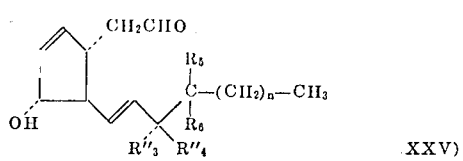

XXV)

wherein $R''_3$, $R''_4$, $R_5$, $R_6$ and n are as defined above or a mixture of the 15S- and 15R-derivative. The reduction may be performed by treatment with a diisobutylaluminium hydride or sodium bis-(2-methoxyethoxy)aluminium hydride in an inert solvent, for example toluene, n-heptane, n-hexane or benzene or their mixtures, at below $-30°C$;

9. optional deetherification of the compound of formula (XXV) to give a compound having the free 15-hydroxy group ; the deetherification may be accomplished, as described above, by mild acid hydrolysis, in a solvent miscible with water, with a solution of a mono- or polycarboxylic acid. All the compounds of formulae (XIX) to (XXV) may be either optically active or racemic compounds.

The compounds with general formula (1) in which $R_2$, $R_3$ and $R_4$ are hydrogen atoms, show antiprostaglandin activity; the remaining compounds with general formula (1) can be used in the same applications as natural prostaglandins, which applications are described, for example, by Bergstrom, Science 157, 382, (1967). They offer, however, in comparison with natural prostaglandins not only the advantage of a reduced metabolic degradation rate but also, as shown for example in the table below, the advantage of more highly selective therapeutic action. This table gives the spasmogenic, hypotensive, antilipolytic and antibronchospastic activity of compounds 5c,13t-11α, 15S-

| Compound | Hypotensive activity | Antilipolytic activity ED 30% | Spasmogenic activity | | Antibronchospastic activity |
|---|---|---|---|---|---|
| | | | Guineapig ileum | Rat uterus | |
| $PGE_2$ | 1 | $1.8 \times 10^{-8} M$ | 1 | 1 | 1 |
| 5c, 13t-11α, 15S-dihydroxy-prosta-5,9,13-trienoic acid | 0.04 | $> 10^{-6} M$ | 0.175 | 1.3 | 0.5 |
| 5c, 13t-11α, 15R-dihydroxy-prosta-5,9,13-trienoic acid | 0.01 | $> 10^{-6} M$ | 0.001 | 0.06 | 1.05 |

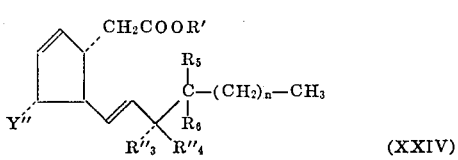

(XXIV)

wherein R', Y'', $R_5$, $R_6$ and $n$ are as defined above and one of $R''_3$ and $R''_4$ is a hydrogen atom or a $C_{1-6}$ alkyl or $C_{2-6}$ alkenyl group and the other is a known protecting group bound to the chain by an ethereal oxygen atom, or a mixture of the 15S- and 15R-derivative.

The etherification may be performed as already described above;

8. reduction of the compound of formula (XXIV) or of a mixture of the 15S- and 15R-derivative to give a compound of formula (XXV)

dihydroxy-prosta-5,9,13-trienoic acid, and 5c,13t-11α,15R-dihydroxy-prosta-5,9,13-trienoic acid, compared to natural prostaglandin $PGE_2$.

The hypotensive effect was determined in the anaesthetized rat treated with a ganglioplegic agent; the compounds under examination were injected intravenously at a constant volume of 0.1 ml.

Two serial doses of the standard were injected, with an intermediate dose of the test compound. Results were expressed as potency ratios.

Antilipolytic activity was tested in vitro as follows: adipose cells isolated according to Rodbell, J. Biol. Chem. 239, 375 (1964), were incubated 1 hour with a dose of theophylline sufficient to cause the equivalent of about 90 percent of basal lipolysis, in the presence of increasing doses of the test compounds and the standard ($PGE_2$). Activity was expressed as the doses capable of inhibiting lipolysis by 30 percent (ED 30%). Spasmogenic activity was tested on guineapig ileum and on rat uterus.

The guineapig ileum test consisted of a 10 ml thermostatic bath held at 35°C, containing the ileum of a male guineapig, under 0.5 g traction, carboxygenated in a Tyrode solution; this was left for 30 minutes to stabilize before the compounds were tested. The response was recorded using an isotonic frontal lever, long enough to amplify the response 4.5 times. The dose-response log function was calculated for each compound and for the standard, together with the potency ratio and relative fiducial limits (P = 0.05).

The rat uterus test consisted of a 10 ml thermostatic bath held at 29°C, in which oestrogenized rat uteri under 0.5 g traction were carboxygenated in a Dejalon saline solution. The preparation was left to stabilize for 30 minutes before the compounds and standard were tested. Response was measured using an isotonic frontal lever, long enough to amplify the response 4.5 times The dose/response log function was claculated for each compound and for the standard, together with the potency ratio and relative fiducial limits (P = 0.05). Antibronchlospastic (anti-asthmatic) activity was determined in guineapigs divided into groups, and treated with a histamine spray (0.2 percent aqueous solution of histamine hydrochloride); the time when the animal showed bronchospasm was then recorded. Four hours later, the same animals were treated with a spray of the test compounds at different dilutions in saline, and to a spray of standard $PGE_2$ solution. They were then given another histamine spray (0.2%) and again, the times taken for bronchospasm to appear were noted. The results were expressed as potency ratios.

The compounds of general formula (1) can be administered orally, parenterally or intravenously, by rectal suppositories or by inhalation. For example, they can be administered by intravenous infusion of a sterile isotonic saline solution at the rate of 0.01 to 10, preferably 0.05 to 1, μg/kg of mammal body weight per minute.

The invention therefore also provides a pharmaceutical composition comprising a compound of general formula (1) and a pharmaceutically acceptable carrier or diluent.

The compositions may be prepared by conventional methods and can be, for example, in the form of tablets, capsules, pills, suppositories or bougies, or in liquid form e.g. solutions, suspensions or emulsions.

Examples of substances which can serve as carriers or diluents are water, gelatin, lactose, starches, magnesium stearate, talc, vegetable oil, benzyl alcohol, and cholesterol.

The invention is illustrated by the following Examples, wherein the abbreviations "THP", "DIOX", and "DIBA" refer to tetrahydropyranyl, dioxanyl, and diisobutylaluminium hydride, respectively.

EXAMPLE 1

A solution of 5β-hydroxymethylbenzylether--hydroxy-cyclopent-2-enyl-1α-acetic acid (6.5 g) in benzene is treated with a 0.03 M solution of a diazoalkane in ether.

After 15 minutes at room temperature, the mixture is evaporated to dryness in vacuo to afford 0.025 moles of a 5β-hydroxymethylbenzylether-4α-hydroxy-cyclopent-2-enyl-1α-acetic acid alkyl ester.

The following are prepared:
dl-5β-hydroxymethylbenzylether-4α-hydroxy-cyclopent-2-enyl-1α-acetic acid methyl ester; 5β-hydroxymethylbenzylether-4α-hydroxy-cyclopent-2-enyl-1α-acetic acid methyl ester; 5β-hydroxymethylbenzylether-4α-hydroxy-cyclopent-2-enyl-1α-acetic acid ethyl ester; dl-5β-hydroxymethylbenzylether-4α-hydroxy-cyclopent-2-enyl-1α-acetic acid ethyl ester.

EXAMPLE 2

To a solution of 2,76 g of 5β-hydroxymethylbenzylether-4α-hydroxy-cyclopent-2-enyl-1α-acetic acid methyl ester in dry benzene a solution of 19 mg of p-toluene-sulfonic acid in benzene and 4 ml of 2,3-dihydropyran is added. After 8 hours at room temperature the reaction mixture is treated with anydrous potassium carbonate (80 mg), stirred for an additional 8 minutes and then is diluted with water.

The organic phase is washed with water, 2 percent solution of sodium hydrogen carbonate and water to neutrality; after percolation through a short column of silica gel with cyclohexane-ethyl ether (8:2) as eluent and evaporation of the solvent 3,36 g of 4α-hydroxy-5β-hydroxymethylbenzyl-ether-cyclopent-2-enyl-1α-acetic acid methyl ester-4-THP-ether are obtained.

In similar way, using 1,4-diox-2-ene the etherification gives, as an oil, 4α-hydroxy-5β-hydroxymethylbenzylether cyclopent-2-enyl-1α-acetic acid methyl ester -4-dioxa-1',4'-nyl-ether.

Likewise an acetal 4-ether is prepared from the following ester:
cyclopent-2-enyl-4α-hydroxy-5β-hydroxymethylbenzylether-1α-acetic acid ethyl ester.

EXAMPLE 3

Under a nitrogen atmosphere, a solution of 5β-hydroxymethylbenzylether-4α-hydroxy-cyclopent-2-enyl-1α-acetic acid methyl ester-4-THP-ether (2.73 g, $0.75.10^{-2}$ mole) in dry toluene (38 ml), cooled at −60°, is treated over 10 minutes with 0.5 M DIBA in toluene (30 ml). The mixture is stirred for an additional 30 minutes at −60°, and then the excess reactive is destroyed by addition of a 2M-isopropanol solution in toluene (7.5 ml).

After 10 minutes, the mixture is warmed up to 0°–2°, treated with water (3 ml), sodium sulphate (8 g) and celite (5 g) end is then filtered.

The elucite filtrate is evaporated to dryness in vacuo to obtain, as an oil, the 5β-hydroxymethylbenzylether-4α-hydroxy-cyclopent-2-enyl-1α-ethanal-4-THP-ether (2.56 g). Starting from the acetal ester of the Example 2 and following the same procedure, we prepare:

dl-5β-hydroxymethylbenzylether-4α-hydroxy-cyclopent-2-enyl-1α-ethanal-4-THP-ether;
5α-hydroxymethylbenzylether-4α-hydroxy-cyclopent-2-enyl-1α-ethanal-4-DIOX-ether and its dl-derivative.

EXAMPLE 4

Under a nitrogen atmosphere, a stirred solution of 3.18 g of an acetal ether [e.g. 4-THP-ether] of the cyclopent-2-enyl-4α-hydroxy-5β-hydroxymethylbenzylether-1α-ethanal and of 8.87 g of 5-triphenylphosphonium-pentanoic acid bromice in 47 ml of dimethylsulfoxide ($H_2O$ 0.02%), is treated with a solution of 4.48 g of potassium t-butylate in 40 ml of DMSO; the temperature of the reaction mixture is controlled at about 15°C by external cooling.

The mixture is stirred at this temperature for an additional 4 hours and then diluted with water (80 ml). The aqueous phase is extracted with ether in order to remove any unreacted product and the triphenyl phosphoxide and the combined organic layers are reextracted with 5% sodium bicarbonate. The pH of the combined aqueous phases is adjusted to 4.5–4.7 with $4N—H_2SO_4$ and saturated $NaH_2PO_4$ solution, followed by extraction with ethyl ether-pentane (1:1). The combined organic phases are washed to neutrality and evaporated to dryness affording 3.62 g of 4α-hydroxy-5βhydroxymethylbenzylether-cyclopent-2-enyl-1α-(7'-hept-5'-en-1'-oic acid)-4-THP-ether. This compound is then dissolved in 30 ml of ethanol and, at reflux temperature, sodium (1.52 g) is added portionwise. The reaction is allowed to progress until the alkaline metal is totally dissolved, the solvent is evaporated to half its volume and the resulting product is diluted with three volumnes of water and acidified to pH 4.5–4.7.

The solution is saturated with soidum chloride and extracted with benzene-methylene chloride (4:1). The organic phases are combined, washed up to neutrality, dried ($Na_2SO_4$) and evaporated to dryness giving 2.25 g of 4α-hydroxy-5β-hydroxymethyl-cyclopent-2-enyl-1α-(7'-hept-5'-cis-en-1'-oic acid)-4-THP-ether which, by treatment with an ethereal solution of diazomethane, is then converted to the corresponding methyl ester.

In a similar way, starting from a 4-acetal ether [4-THP-ether] as well as from 4-DIOX-ether of the 4α-hydroxy-5β-hydroxymethylbenzylether-cyclopent-2-enyl-1α-ethan-1'-al by reaction with the corresponding phosphoran and subsequent debenzylation and esterification with diazomethane the methyl esters of the 4-acetal ether, viz.4-THP-ether and 4-DIOX-ether of the following acids in the optical acitve or racemic forms, are obtained:

5β-hydroxymethyl-4α-hydroxy-cyclopent-2-enyl-1α-(7'-hept-5-cis-en-1'-oic acid);
5β-hydroxymethyl-4α-hydroxy-cyclopent-2-enyl-1α-(7'-3'-oxahept-5'-cis-en-1'-oic acid);
5β-hydroxymethyl-4α-hydroxy-cyclopent-2-enyl-1α-(7'-hepta-2'C,5'c-dien-1'-oic acid);
5β-hydroxymethyl-4α-hydroxy-cyclopent-2-enyl-1α-(7'-hepta-2t,5c-dien-1'-oic acid);
5β-hydroxymethyl-4α-hydroxy-cyclopent-2-enyl-1α-(7'-hept-5'c-en-2'-yn-1-oic acid).

EXAMPLE 5

A solution of 3.6 g of 4α-hydroxy-5β-hydroxymethylbenzyl-ether-cyclopent-2-enyl-1α-acetic acid methyl ester-4-DIOX-ether in anhydrous ether is added dropwise to a stirred suspension of 0.45 g of $LiAlH_4$ in anhydrous ether. The stirring is continued for two hours, the excess reagent is destroyed by cautious addition of moist ether; sodium sulfate is added and the ethereal solution is filtered and evaporated to dryness yielding 3.32 g of 4α-hydroxy-5β-hydroxymethylbenzylether-cyclopent-2-enyl-1α-(1'-hydroxy)-ethyl-4-DIOX-ether which are dissolved in 30 ml of methylene chloride and 0.5 ml of anhydrous pyridine (distilled over BaO). This solution was added all at once to a solution of a pyridine-chromium troxide complex in methylene chloride prepared as follows:

to 150 ml of methylene chloride (purified by washing with concentrated sulfuric acid and then with water and ice to neutrality, dried over $CaCl_2$, distilled and stored on molecular sieves while sheltered from the light) 10 ml of pyridine (anhydrous by distillation over BaO) are added, and then with outer cooling to about 10–12°C, chromium trioxide (6 g) is added. A complete dissolution takes place in 10'–15' and the solution of the alcohol is all at once added. The stirring is continued further for 10'; the inorganic material separated is decanted off and the residue is washed with methylene chloride. The organic phases are then evaporated to dryness.

The residue is taken up in benzene-ethyl ether (1:1); the organic phase is washed successively with 2N citric acid, water, 5% sodium hydrogen carbonate solution and water and thereafter it is evaporated to dryness to obtain 2.95 g of 4α-hydroxy-5β-hydroxymethylbenzylether-cyclopent-2-enyl-1α-ethanal-4-DIOX-ether. This compound is dissolved in 20 ml of anhydrous tetrahydrofuran. The solution is added dropwise to a solution of an ylide prepared as follows: a suspension of 1.08 g of 80% NaH (in mineral oil) in 30 ml of DMSO is heated, to the exclusion of humidity and in inert gas atmosphere, to 70° up to complete release of $H_2$ (about 2 hours); after cooling to 5–10°C a solution of 7.98 g of triohenylphosphonium pentanoic acid bromide in 25 ml of DMSO is added. The temperature is maintained to about 18–20° and the stirring is continued for 4 hours.

The mixture is diluted with the same volume of water and, after a set of extractions to remove the triphenylphosphoxide formed, is acidified to pH 4.5–4.7 and extracted with ethyl ether-pentane (1:1). The combined extracts are washed to neutrality and dried over sodium sulfate to yield 3.01 g of 4α-hydroxy-5β-hydroxymethylbenzylether-cyclopent-2-enyl-1α-(7'-hept-5'-en-1'-oic acid)-4-DIOX-ether.

EXAMPLE 6

To a solution of 1 g of 4α-hydroxy-5β-hydroxymethylbenzyl-ether-cyclopent-2-enyl-1α-ethanal-4-THP-ether and 3.24 g of 5-triphenylphosphonium pentanoic acid n-heptyl ester bromide in 15 ml of DMSO a solution of 750 mg of diazobiciclononene in DMSO is added dropwise maintaining the temperature of the medium at about 15°–18°C. After dilution with 45 ml of water a thorough extraction with ethyl ether is carried out.

From the organic phases, after washing with water to neutrality, dehydration and solvent evaporation, a mixture of triphenylphosphoxide and 4α-hydroxy-5β-hydroxy-methylbenzylether-cyclopent-2-enyl-1α-(7'-hept-5'-en-1'-oic acid n-heptyl ester)-4-2''-(tetrahydropyranylether)-is obtained. This product is dissolved in 50 ml of acetone, and 40 ml of a 0.2N solution of oxalic acid are added; the mixture is maintained at 35°–38°C for 6 hours. Most of the acetone is evaporated. After extraction with methylene chloride the organic phase is washed with water to neutrality, is dried and evaporated to dryness. Percolation through a short column of silica gel with cyclohexane-ethyl acetate (70:30) allows to obtain 1.1 g of pure 4α-hydroxy-5β-hydroxymethylbenzylether-cyclopent-2-enyl-1α-(70'-hept-5'-en-1'-oic acid-n-heptyl ester) which is then converted with pyridine-acetic anhydride to the corresponding acetate. To a solution of 0.94 g of this product, viz.4α-hydroxy-5β-hydroxymethylbenzylether-cyclopent-2-enyl-1α-(7' -hept-5'-en-1'-oic acid-n-heptyl ester)-4-acetate in 30 ml of methylene chloride (purified), trityl fluoborate (0.726 g) is added. The mixture is maintained at room temperature for 12 hours, is washed with a 5 percent solution of sodium hydrogen carbonate and with water to neutrality. After concentrating the solvent, the residue is filtered through a short column of silica gel. Elution with methylene chloride yields 0.61 g of 4α-hydroxy-5β-hydroxymethyl-cyclopent-2-enyl-1α-(7'-hept-5'-en-1'-oic acid-n-heptyl ester)-4-acetate.

EXAMPLE 7

A solution of $2.5,10^{-2}$ moles (1 g) of 4α-hydroxy-5β-hydroxy- methylbenzylether-cyclopent-2-enyl-(7'-hept-5'-en-1'-oic acid)-4-THP-ether is treated in 30 ml of acetone with 0.2N oxalic acid for 10 hours at 35°–38°C.

Most of the solvent is evaporated and the residue is repeatedly extracted with ethyl ether-methylene chloride (4:1).

The joined organic phases, after washing to neutrality with water, are evaporated to dryness yielding 0.78 g of 4α-hydroxy-5β-hydroxymethylbenzylether-cyclopent-2-enyl-1α-(7'-hept-5'-en-1'-oic acid) to which $2.8,10^{-2}$ moles of a diazoalkane (diazoethane) are added in benzene. After 10' the solution is evaporated to dryness and the residue is taken up in pyridine and $3,10^{-2}$ moles of propionic anhydride. The solution is maintained for 3 hours at room temperature, diluted with 2N citric acid and extracted with ethyl ether. The organic phases evaporated to dryness afford 0.82 g of 4α-hydroxy-5β-hydroxymethylbenzylether-cyclopent-2-enyl-1β-(7'-hept-5'-en-1'-oic acid ethyl ester)-4-propionate. A solution of this compound in 5 ml of anhydrous tetrahydrofuran is added to a solution of 25 ml of NH₃ with external cooling at −40°C.

Then 0.92 g of Na are added successively until permanence for 5' of a deep blue color. Excess ammonium chloride is added until complete decolorization. Ammonium is removed be evaporation and the product is diluted with water and extracted with ethyl ether-methylene chloride; the joined organic phases are washed with water to neutrality, dried (Na₂SO₄) and evaporated to dryness yielding, after purification on silica gel with cyclohexane-ethyl ether (65:35), 515 mg of 4α-hydroxy-5β-hydroxymethyl-cyclopent-2-enyl-1α-(7'-hept-5'-en-1-oic acid-n-heptyl ester)-4-propionate;

EXAMPLE 8

(2-oxo-heptyl)-dimethoxyphosphonate (2.2 m moles) in 5 ml of benzene is added to a suspension of 2.2 m moles of sodium hydride (80 percent in mineral oil) in 30 ml of benzene. The addition is carried out dropwise with simultaneous evolution of hydrogen; an abundant precipitate of the sodium salt of the phosphonate develops suddenly producing a suspension hard to agitate. The salt formation is complete in the space of 10 minutes.

At the same time, with external cooling, stirring and exclusion of humidity, 2 ml of pyridine (distilled over BaO) and then 1.2 g of CrO₃ (allowed to stand for two days over P₂O₅) are added to 30 ml of purified methylene chloride.

The mixture is allowed to return at room temperature and a complete dissolution of the pyridine-CrO₃ complex occurs within 10–15 minutes.

To this solution is added a solution of 675 mg of 4α-hydroxy-5β-hydroxymethyl-cyclopent-2-enyl-1α-(7'-hept-5'-en-1'-oic acid methylester)-4-THP-ether in 8 ml of CH₂Cl₂ and 0.5 ml of pyridine. After stirring for 12 minutes and decanting off the organic layer, the brown-black precipitate separated is washed with methylene chloride (2 × 15 ml). The organic phase is then concentrated to 5 ml, diluted with 30 ml of benzene and, if that is the case, filtered from other complexes separated and is added all at once to the suspension of 2.2 moles of sodium (2-oxo-heptyl)-phosphonate previously prepared. While maintaining under agitation, a complete dissolution takes place after two minutes and the reaction of transole-fination is complete after 10 minutes. An aqueous concentrated solution of 12–14 m moles of monobasic phosphate is added quickly under high stirring. The organic phase is separated, washed with water and then evaporated to dryness yielding, after filtration on silica gel with cyclohexane-ethyl ether-pyridine (80:20:0.5) as eluent, 790 mg of 5c,13t-11α-hydroxy-15-oxo-prosta-5,9,13-trienoic acid methyl ester-11-THP-ether. A close application of this succession of operations allows the preparation, from the corresponding 5-hydroxymethyl derivatives disclosed in Examples 4, 6 and 7, of the acetal 11-ethers, viz. 11-2'-(tetrahydropyranylethers) and 11-2'(dioxa-1',4'-nylethers), of the following prostatrienoic acid:

dl-5c,13t-11α-hydroxy-15-oxo-prosta-5,9,13-trienoic acid methyl ester;

5c,13t-11α-hydroxy-15-oxo-prosta-5,9,13-trienoic acid methyl ester;

3-oxa-5c,13t-11α-hydroxy-15-oxo-prosta-5,9,13-trienoic acid methyl ester;

2c,5c,13t-11α-hydroxy-15-oxo-prosta-2,5,9,13-tetraenoic acid methyl ester;

2-t,5c,13t-11α-hydroxy-15-oxo-prosta-2,5,9,13-tetraenoic acid methyl ester;

5c,13t-11α-hydroxy-15-oxo-prosta-5,9,13-trien-2-ynoic acid methyl ester;

and the following 11α-esters:

5c,13t-11α-hydroxy-15-oxo-prosta-5,9,13-trienoic acid-n-heptylester-acetate;

5c,13t-11α-hydroxy-15-oxo-prosta-5,9,13-trienoic acid-n-heptylester-11-propionate.

EXAMPLE 9

When operating according to the above example a 4-acetal ether-5-hydroxymethyl derivate is oxidized to the 5-formyl derivatives and in the next reaction of trans-olefination the sodium derivative of the 2-oxo-heptyl-dimethoxy-phosphonate is replaced by the sodium derivative of the 2-oxo-octyl-dimethoxy-phosphonate and by the sodium derivative of the (2-oxo-(3-methyl)-heptyl)-dimethoxy phosphonate, the 11α-acetal ethers, viz. the 11-THP-ethers and the 11-DIOX-ether of the following prostatrienoic acids are likely prepared:

5c,13t-11α-hydroxy-15-oxo20ω-homo- prosta-5,9,13-trienoic acid methyl ester;
5c,13t-11α-hydroxy-15-oxo-16-methyl-prosta-5,9,13-trienoic acid methyl ester.

EXAMPLE 10

1,29 g of 5c,13t-11α-hydroxy-15-oxo-prosta-5,9,13-trienoic acid methyl ester-11-acetal ether are dissolved in 50 ml of acetone and 40 ml of 0.1N oxalic acid. The solution is maintained at 36°C for 5 hours, most of the solvent is evaporated under vacuum, the residue is extracted with ethyl ether and the organic phase is washed to neutrality with water and evaporated to dryness. The 5c,13t-11α-hydroxy-15-oxo-prosta-5,9,13-trienoic acid methyl ester (0.98 g) thus obtained is dissolved in 6 ml of pyridine and reacted at room temperature with 650 mg of p-phenylbenzoyl chloride. Anhydrous methanol (0.2 ml) is added and after 40 minutes the mixture is diluted with 2N citric acid. After extraction with ethyl ether, washing of the organic phase with 0.2N nitric acid, water, sodium hydrogen carbonate and water, 1.5 g of 5c,13t-11α-hydroxy-15-oxo-prosta-5,9,13-trienoic acid methyl ester-11-p-phenyl-benzoate are obtained by solvent evaporation.

In the same manner the following 11-esters are prepared:

5c,13t-11α-hydroxy-15-oxo-prosta-5,9,13-trienoic acid methyl ester-11-cyclopentylpropionate;
5c,13t-11α-hydroxy-15-oxo-prosta-5,9,13-trienoic acid methyl ester-11-phenyl acetate;
5c,13t-11α-hydroxy-15-oxo-prosta-5,9,13-trienoic acid methyl ester-11-phenyl propionate.

EXAMPLE 11

150 mg of $NaBH_4$ are added at 0°C to a solution of $4.10^{-3}$ moles of an 11α-acetal ether of the 5c-13t-11α-hydroxy-15-oxo-prosta-5,9,13-trienoic acid methyl ester (viz.(11α-THP-ether) 1.73 g) in 20 ml of methanol and 5 ml of methylene chloride. The mixture is maintained at 0°C for 12', neutralized with 15% acetic acid, concentrated under vacuum, taken up in an excess of ether-methylene chloride (4:1), washed to neutrality with water and evaporated to dryness.

The residue, a mixture (1.5:1) of the epimeric 15S and 15R alcohols of the 5c,13t-11α, 15-dihydroxy-prosta-5,9,13-trienoic acid methyl ester-11-tetrahydropyranylether, is taken up in acetone and 0.1N oxalic acid (50:50) and allowed to stand at 38°C for 12 hours. The acetone is evaporated; the aqueous phase is extracted with ethyl ether and from the organic phases, washed to neutrality and evaporated to dryness, after absorption on silica gel and elution with cyclohexane-ethyl ether (40:60) 5c,13t-11α, 15S-dihydroxy-prosta-5,9,13-trienoic acid methyl ester (0.62 g) and 5c,13t-11α, 102 15R-dihydroxy-prosta-5,9,13-trienoic acid methyl ester (0.41 g) are obtained.

EXAMPLE 12

A solution of $2.5,10^{-3}$ moles of a 1,11-diester (e.g. 1.44 g of 5c,13t-11α-hydroxy-15-oxo-prosta-5,9,13-trienoic acid methyl ester-11-p-phenyl benzoate) in 40 ml of dimethoxy ethane is added in 15', under stirring and external cooling, to 220 ml of a 0.65 M solution of zinc boronhydride in ether. 11α, 11α, After stirring for 2 hours the excess reagent is destroyed with a 2N solution of sulfuric acid. The organic phases are washed to neutrality with a saturated solution of ammonium sulfate, dried over sodium sulfate and evaporated to dryness to afford, besides traces of two products having an higher $R_f$, a mixture ≈60:40 of two alcohols, one of higher $R_f$ (15S) and the other of lower $R_f$ (15R). This mixture is separated by preparative thin layer chromatography, with cyclohexane-ethyl (65:45) as an eluent, yielding 605 mg of 5c,13t-11α-15S-dihydroxy-prosta-5,9,13-trienoic acid methyl ester-11-p-phenylbenzoate and 480 mg of the epimeric 5c,13t-11α-15R-dihydroxy-prosta-5,9,13-trienoic acid methyl ester-11-p-phenylbenzoate.

EXAMPLE 13

By the procedure disclosed in the Examples 11 and 12, the preparation is accomplished of the 15S and 15R alcohols of the following prostatrienoic acids, said alcohols being then separated from each other by column chromatography or preparative TLC (thin layer chromatography):

dl-5c,13t-11α,15S-dihydroxy-prosta-5,9,13-trienoic acid methyl ester;
5c,13t-11α, 15S-dihydroxy-prosta-5,9,13-trienoic acid methyl ester;
5c,13t-11α, 15S-dihydroxy-3-oxa-prosta-5,9,13-trienoic acid methyl ester;
5c,13t-11α, 15S-dihydroxy-20ω-homo-prosta-5,9,13-trienoic acid methyl ester;
5c,13t-11α, 15S-dihydroxy-16-methyl-prosta-5,9,13-trienoic acid methyl ester;
2c,5c,13t-11α, 15S-dihydroxy-prosta-2,5,9,13-tetraenoic acid methyl ester;
2t,5c,13t-11α, 15S-dihydroxy-prosta-2,5,9,13-tetraenoic acid methyl ester;
5c,13t-11α, 15S-dihydroxy-prosta-5,9,13-trien-2-ynoic acid methyl ester;
5c,13t-11α, 15S-dihydroxy-prosta-5,9,13-trienoic acid-n-heptyl ester-11-acetate;
5c,13t-prosta-11α, 15S-dihydroxy-5,9,13-trienoic acid-n-heptyl ester-11-propionate;
5c,13t-11α, 15S-dihydroxy-prosta-5,9,13-trienoic acid methyl ester-11p-phenylbenzoate;
5c,13t-11α, 15S-dihydroxy-prosta-5,9,13-trienoic acid methyl ester-11-phenylacetate;
5c,13t-prosta-11α, 15S-dihydroxy-5,9,13-trienoic acid methyl ester-11-phenylpropionate;
5c,13t-11α, 15S-dihydroxy-prosta-5,9,13-trienoic acid methyl ester-11-cyclopentylpropionate;
dl-5c,13t-11α, 15R-dihydroxy-prosta-5,9,13-trienoic acid methyl ester;
5c,13t-11α, 15R-dihydroxy-prosta-5,9,13-trienoic acid methyl ester;

5c,13t-11α, 15R-dihydroxy-3-oxa-prosta-5,9,13-trienoic acid methyl ester;

5c,13t-11α, 15R-dihydroxy-20ω-homo-prosta-5,9,13-trienoic acid methyl ester;

5c,13t-11α, 15R-dihydroxy-16-methyl-prosta-5,9,13-trienoic acid methyl ester;

2c,5c,13t-11α, 15R-dihydroxy-prosta-2,5,9,13-tetraenoic acid methyl ester;

2t,5c,13t-11α, 15R-dihydroxy-prosta-2,5,9,13-tetraenoic acid methyl ester;

5c,13t-11α, 15R-dihydroxy-prosta-5,9,13-trien-2-ynoic acid methyl ester;

5c,13t-11α, 15R-dihydroxy-prosta-5,9,13-trienoic acid-n-heptyl ester-11-acetate;

5c,13t-11α,15R-dihydroxy-prosta-5,9,13-trienoic acid-n-heptyl ester-11-propionate;

5c,13t-11α,15R-dihydroxy-prosta-5,9,13-trienoic acid methyl ester-11-p-phenylbenzoate;

5c,13t-11α,15R-dihydroxy-prosta-5,9,13-trienoic acid methyl ester-11-phenyl acetate;

5c,13t-11α,15R-dihydroxy-prosta-5,9,13-trienoic acid methyl ester-11-phenyl propionate;

5c,13t-11α,15R-dihydroxy-prosta-5,9,13-trienoic acid methyl ester-11-cyclopentylpropionate.

EXAMPLE 14

To a solution of 1.3 g of 5c,13t-11α,15S-dihydroxy-prosta-5,9,13-trienoic acid methyl ester in 15 ml of methanol a N solution (4 ml) of KOH in methanol is added and the mixture is kept at room temperature for 2 hours. After acidification with 4.2 ml of N sulfuric acid the solution is diluted with the same volume of water and concentrated in vacuo. The product is extracted with ethyl ether and from the organic phase, after usual washing with water to neutrality, dehydration and evaporation to dryness, 1.12 g of 5c,13t-11α,15S-dihydroxy-prosta-5,9,13-trienoic acid are obtained.

In the same way the following acids are obtained from the corresponding esters:

dl-5c,13t-11α,15S-dihydroxy-prosta-5,9,13-trienoic acid; 5c,13t-11α,15S-dihydroxy-prosta-5,9,13-trienoic acid;

5c,13t-11α,15S-dihydroxy-3-oxa-prosta-5,9,13-trienoic acid;

5c,13t-11α,15S-dihydroxy-20ω-homo-prosta-5,9,13-trienoic acid;

5c,13t-11α,15S-dihydroxy-16-methyl-prosta-5,9,13-trienoic acid;

2c,5c,13t-11α,15S-dihydroxy-prosta-2,5,9,13-tetraenoic acid; 2t,5c,13t-11α,15S-dihydroxy-prosta-2,5,9,13-tetraenoic acid;

5c,13t-11α,15S-dihydroxy-prosta-5,9,13-trien-2-ynoic acid dl-5c,13t-11α,15R-dihydroxy-prosta-5,9,13-trienoic acid;

5c,13t-11α,15R-dihydroxy-prosta-5,9,13-trienoic acid;

5c,13t-11α,15R-dihydroxy-3-oxa-prosta-5,9,13-trienoic acid;

5c,13t-11α,15R-dihydroxy-20ω-homo-prosta-5,9,13-trienoic acid;

5c,13t-11α,15R-dihydroxy-16-methyl-prosta-5,9,13-trienoic acid;

2c,5c,13t-11α,15R-dihydroxy-prosta-2,5,9,13-tetraenoic acid; 2t,5c,13t-11α,15R-dihydroxy-prosta-2,5,9,13-tetraenoic acid; 5c,13t-11α,15R-dihydroxy-prosta-5,9,13-trien-2-ynoic acid;

EXAMPLE 15

0.9 g of n-octanol and 0.5 g of cyclohexylcarbodiimide are added to a solution of 0.5 g of 5c,13t-11α,15S-dihydroxy-prosta-5,9,13-trienoic acid in 0.8 ml of pyridine and 28 ml of methylene chloride. After 3 hours the mixture is adsorbed on a silica gel column with cyclohexane-ethyl ether (80:20) as eluent, obtaining pure 5c,13t-11α,15S-dihydroxy-prosta-5,9,13-trienoic acid-n-octyl ester.

In the same way the following compounds are prepared: 5c,13t-11α,15S-dihydroxy-prosta-5,9,13-trienoic acid-n-hexyl ester;

5c,13t-11α,15S-dihydroxy-prosta-5,9,13-trienoic acid-n-heptyl ester;

5c,13t-11α,15-dihydroxy-20ω-homo-prosta-5,9,13-trienoic acid-n-heptyl ester.

EXAMPLE 16

4.2 g of p-toluensulfonyl chloride in pyridine are added, while cooling to about 0°–5°C, to a solution of 1.75 g of 5c,13t-11α,15R-dihydroxy-prosta-5,9,13-trienoic acid methyl ester ($5.10^{-3}$ moles) in pyridine. The solution is maintained under stirring for 5 hours at 15°–18°C and overnight at 5°C, then is diluted with 2N solution of citric acid, is extracted repeatedly with ethyl ether and from the organic phases, after the usual washings with 0.2N citric acid, water, 1.5% KHCO$_3$ aqueous solution and water to neutrality, by cautious solvent evaporation 3.2 g of 5c, 13t-11α,15R-dihydroxy-prosta-5,9,13-trienoic acid methyl ester-11,15-p-toluensulfonate are obtained.

This product is dissolved in anhydrous ether and added dropwise to a suspension of lithium aluminium hydride (2 g) in ethyl ether-tetrahydrofuran (1:1). The mixture is refluxed for 4 hours, the excess reagent is decomposed with most ether, celite and anhydrous sodium sulfate are added to the suspension and the mixture is filtered. By solvent evaporation and chromatography on silica gel with CH$_2$Cl$_2$, 0.93 g of 5c,13t-1-hydroxy-prosta-5,9,13-trien are obtained.

In the same way the following compounds are prepared: 5c,13t-1-hydroxy-3-oxa-prosta-5,9,13-triene;

5c,13t-1-hydroxy-20ω-homo-prosta-5,9,13-triene.

EXAMPLE 17

5.8 ml of Jones' reagent are all at once added to a solution in acetone (60 ml) of 0.42 g of 5c,13t-1-hydroxy-prosta-5,9,13-triene, cooled to −5/0°C. Aafter stirring for 75' the product is diluted with 300 ml of a mixture of ethyl ether methylene chloride (5:1), the organic phase is washed with 30 ml of saturated sodium chloride solution, with 30 ml and 12 ml of 10.5 g KI and 10.5 g sodium thiosulfate solution in 60 ml of H$_2$O, afterwards for 5 times with 30 ml of an aqueous saturated solution of NaHCO$_3$ and finally with 25 ml of a saturated sodium chloride solution. These last six extracts are combined and acidified with 2N sulfuric acid. After salting with ammonium sulfate the mixture is extracted with ethyl ether-methylene chloride (5:1) and from the organic phases, brought to neutrality with (NH$_4$)$_2$SO$_4$ saturated solution, 0.31 g of lightly impure 5c,13t-prosta-5,9,13-trien-1-oic acid are obtained by solvent evaporation. This acid is then purified by chromatography on silica gel with cyclohexane-ethyl ether as eluent.

In the same way the following acids are prepared:
5c,13t-3-oxa-prosta-5,9,13-trien-1-oic acid;

5c,13t-20ω-homo-prosta-5,9,13-trien-1-oic acid.

EXAMPLE 18

12.8 g of the dehydroabietylammonium salt of the 5-β-benzyloxymethyl-cyclopent-2-ene-4α-hydroxy-1α-acetic acid ($[\alpha]_D = +28.8°$ (MeOH)) are dissolved in 70 ml of 1N solution of potassium hydroxide and extracted with ether to remove the dehydroabietylamine. The aqueous layer is then treated with 4N sulphuric acid to pH 2.5, saturated with ammonium sulphate and repeatedly extracted with ether to afford, after washing up to neutrality with saturated $(NH_4)_2SO_4$ solution and drying on sodium sulphate, pure d-5β-benzyloxymethyl-4α-hydroxy-cyclopent-2-enyl-1α-acetic acid (6.5 g; m.p. 67-68° $[\alpha]_D = +29.6°$ ($CHCl_3$)). This compound is treated with an ethereal solution of diazomethane (1.5 moles/mole) and after 15 minutes the solution is evaporated to dryness to yield 6.6 g of 5β-benzyloxymethyl-4α-hydroxy-cyclopent-2-enyl-1α-acetic acid methyl ester.

This product is dissolved in anhydrous pyridine (20 ml) and treated with p-phenylbenzoyl chloride (6.43 g, 1.2 moles/mole). The reaction mixture is stirred for 12 hours at room temperature, diluted with 2N $H_2SO_4$ and extracted with ethyl ether. The combined organic extracts are repeatedly washed with 2N sulfuric acid, water, sodium hydrogen carbonate and again with water to neutrality, dried ($Na_2SO_4$) and evaporated in vacuo to yield 5β-benzyloxymethyl-4α-hydroxy-cyclopent-2-enyl-1α-acetic acid methyl ester-4-p-phenylbenzoate (10.5 g). A sample purified by chromatography on $SiO_2$ (cyclohexane-ethyl acetate (8:2) as eluent shows $[\alpha]_D = -124°$ ($CHCl_3$). In similar way the 4-acetate, 4-benzoate, 4-propionate esters (in the dl and optically active forms) of the 5β-benzyloxymethyl-4α-hydroxy-cyclopent-2-enyl-1α-acetic acid methyl ester are obtained.

EXAMPLE 19

A solution of 0.46 g of the 5β-benzyloxymethyl-4α-hydroxycyclopent-2-enyl-1α-acetic acid methyl ester-4-p-phenylbenzoate in 10 ml of dry methylene chloride, cooled to 0°, is treated at 0° with a solution of bromine (0.16 g) in methylene chloride until full decolourization. The solution is then cooled to −70°C and treated with a solution of boron tribromide (0.4 ml) in methylene chloride (2 ml). After 5' the mixture is allowed to warm at room temperature, poured in 25 ml of a 10 percent solution of $NaHCO_3$ and extracted repeatedly with ether. The combined organic phases are washed to neutrality with 10% sodium hydrogen carbonate, saturated $(NH_4)_2SO_4$ solution, 5% sodium thiosulfate and NaCl saturated solution, dried ($Na_2SO_4$) and finally evaporated to dryness in vacuo yielding 0.48 g of 2ʄ,3ʄ-dibromo-5β-hydroxymethyl-4α-hydroxy-cyclopentyl-1α-acetic acid methyl ester-4 -p-phenylbenzoate $[\alpha]_D = -28°; [\alpha]_{365°} = -100°$ ($CHCl_3$). Acetic acid (0.5 ml) and zinc dust (400 mg) are added to a solution (24 ml) of this compound in ethyl ether and the mixture is allowed to stand at room temperature for 12 hours under stirring. After filtration the inorganic material is washed with ether and the eluate is washed with 5% sodium hydrogen carbonate and water to neutrality, dried over $Na_2SO_4$, evaporated to dryness yielding 5β-hydroxymethyl-4α-hydroxy-cyclopent-2-enyl-1α-acetic acid methyl ester-p-phenylbenzoate, m.p. 58°-60°, $[\alpha]_d = -132°$ ($CHCl_3$) (0.24 g).

EXAMPLE 20

Pyrrolidone-2-hydrotribromide (PHT) (21.2 g) is added to a solution of 5β-benzyloxymethyl-4α-hydroxy-cyclopent-2-enyl-1α-acetic acid methylester-4-p-phenylbenzoate (10.6 g) in anhydrous THF (100 ml). The mixture is stirred for 12 hours at room temperature, diluted with ether (0.5 l), washed to neutrality with 5% $NaHCO_3$ and saturated ammonium sulfate, dried over $Na_2SO_4$ and evaporated to dryness to yield 14.8 g of the 2,3-dibromo-derivative.

To a stirred solution of this compound in dry methylene chloride (140 ml), cooled at −70°, is added a solution of boron tribromide (6.3 ml) in dry methylene chloride (20 ml). After five minutes, the reaction mixture is warmed at 15°, stirred for ana additional 15 minutes at this temperature and then poured in 300 ml of 10% $KHCO_3$ and extracted with methylene chloride. The organic extracts are washed with a 10 percent solution of sodium hydrogen carbonate and with saturated solution of ammonium sulfate, dried and evaporated to dryness in vacuo yielding 2,3-dibromo-5β-hydroxymethyl-cyclopentyl-4α-hydroxy-1α-acetic acid methyl ester-4-p-phenyl benzoate (13 g).

This compound in ether (400 ml) is treated with acetic acid (2.5 ml) and zinc dust (20 g) and the mixture is stirred for 12 hours at room temperature. The inorganic material is then filtered off, washed with ether; the eluate is washed to neutrality with 5% sodium hydrogen carbonate and water, dried ($Na_2SO_4$) and evaporated to dryness in vacuo to afford 7.3 g (yield 82%) of 5β-hydroxymethyl-4α-hydroxy-cyclopent-2-enyl-1α-acetic acid methyl ester-4-p-phenylbenzoate, m.p. 58°-60°C, from hexane, $[\alpha]_D = -145°; [\alpha]_{365°} = -758°$ ($CHCl_3$).

In the same way the 4-acetate, 4-benzoate, 4-propionate esters of the 5β-hydroxymethyl-4α-hydroxy-cyclopent-2-enyl-1α-acetic acid methyl ester are prepared.

EXAMPLE 21

A stirred solution of dry pyridine (distilled over BaO) (11.9 ml) in dry methylene chloride (180 ml), is treated with chromic anhydride (8.5 g); the stirring is continued for 15 minutes. 5β-hydroxymethyl-4α-hydroxy-cyclopent-2-enyl-1α-acetic acid methyl ester-4-p-phenylbenzoate (4.32 g) in methylene chloride (50 ml) is added thereto in a single portion, followed by vigorous stirring for 15 minutes. The organic layer is decanted and the inorganic materials are washed with methylene chloride and benzene and combined with the originally obtained organic layer.

After concentration to a small volume, the organic phase containing the 5β-formyl-4α-hydroxy-cyclopent-2-enyl-1α-acetic acid methyl ester-4-p-phenylbenzoate is diluted with benzene (150 ml), filtered to remove separated inorganic materials, concentrated in vacuo to 120 ml and then added to a suspension of the sodium salt of dimethyl-(2-oxoheptyl)-phosphonate which was prepared as below: under a nitrogen atmosphere a stirred suspension of 80% sodium hydride dispersion in mineral oil (0.45 g) in benzene (65 ml) is slowly treated with dimethyl-(2-oxo-heptyl)-phosphonate (2.96 ml) in absolute benzene (50 ml). The stirring is continued until the release of hydrogen is ceased (about 1 hour). After 15' from the addition of the formyl derivative to the suspension of the phosphonate sodium salt, the reaction mixture is diluted with water, the organic layer is separated, washed with water to neutrality, dried (Na$_2$SO$_4$) and evaporated to dryness in vacuo producing 5.8 g of crude 5β-(3'-oxo-oct-trans-1'-en-1'-yl)- 4α-hydroxy-cyclopent-2-enyl-1α-acetic acid methyl ester-4-p-phenylbenzoate which is adsorbed on 150 g of silica. Elution with methylene chloride yields 4.01 g of the pure trans-enone $[\alpha]_D$=−206°; $[\alpha]_{365°}$ =−1000° (CHCl$_3$).

A solution of this product in dry ether (70 ml) is added dropwise to a 0.06 M zinc borohydride in ether (250 ml) over 25 minutes under vigorous stirring. The stirring is continued for another 30 minutes; the excess reagent is then destroyed by cautious addition of 4N-H$_2$SO$_4$.

The organic layer is separated and washed with 2N-sulphuric acid, water, 50% sodium hydrogen carbonate and water to neutrality. Each of the aqueous wash solution is re-extracted with ether and combined with the organic phase. After drying (Na$_2$SO$_4$), removal of the solvents in vacuo affords a mixture of the epimeric 15S and 15R alcohols (4 g).

This mixture is absorbed on a silica gel (500 g) column and eluted with isopropyl ether obtaining in the order:

5β-(oct-trans-1'-en-1'-yl)3'S,4α-dihyroxy-cyclopent-2-enyl-1α-acetic acid methyl ester-4-p-phenyl benzoate (1.87 g), $[\alpha]_D$=−129°, $[\alpha]_{365°}$ = −656° (CHCl$_3$);

5β-(oct-trans-1'-en-1'-yl)-3'R,4α-dihydroxy-cyclopent-2-enyl-1α-acetic acid methyl ester-4-p-phenyl benzoate (1.6 g), $[\alpha]_D$=−137°, $[\alpha]_{365°}$ = −675° (CHCl$_3$).

EXAMPLE 22

A solution of 5β-(oct-trans-1'-en-1'-yl)-3'S,4α-dihydroxy-cyclopent-2-enyl-1α-acetic acid methyl ester-4-p-phenylbenzoate (0.44 g) in anhydrous benzene (15 ml) is treated with 2,3-dihydropyran (0.5) and 1 ml of a solution of p-toluenesulfonic acid (30 mg) in benzene (15 ml). After 2 hours at room temperature, 100 mg of potassium carbonate are added; the mixture is diluted with water and the organic phase is washed to neutrality, dried (Na$_2$SO$_4$) and evaporated to dryness in vacuo. The residue absorbed on silica gel (12 g) column by elution with cyclohexane-ethyl ether-pyridine (90:10:0.1) gives 0.52 g of pure 5β-(oct-trans-1'-en-1'-yl)-3'S,4α-dihydroxy-cyclopent-2-enyl-1α-acetic acid-methyl ester-4-p-phenylbenzoate-3'S-THP-ether, $[\alpha]_D$=−133°, $[\alpha]_{365}$ =−633° (CHCl$_3$).

Starting from the 5β-(oct-trans-1'-en-1'-yl)-3'R,4α-dihydroxy-cyclopent-2-enyl-1α-acetic acid methyl ester-4-p-phenyl benzoate and following the same procedure, we prepare:

5α-(oct-trans-1'-en-1'-yl)-3'R,4α-dihydroxy-cyclopent-2-enyl-1α-acetic acid methyl ester-4-p-phenylbenzoate-3'R-THP ether, $[\alpha]_D$= −124°, $[\alpha]_{365°}$ =−600° (CHCl$_3$).

EXAMPLE 23

A stirred solution of 5β-(oct-trans-1'-en-1'-yl)-3'S,4α-dihydroxy-cyclopent-2-enyl-1α-acetic acid methyl ester-4-p-phenylbenzoate-3'-THP-ether (1 g) in dry toluene (32 ml), cooled at −60°, is treated over 10 minutes with a 7.5 percent solution of DIBA in toluene (10.5 ml). The mixture is stirred for an additional 20 minutes at −60°, and then treated with 12 ml of a 2M-isopropanol solution in toluene. After 15 minutes, the mixture is warmed up to room temperature, treated with water (1 ml), sodium sulphate (2 g) and celite (5 g) and then stirred for 2 hours. After filtration and washing with toluene, the eluate is evaporated to dryness in vacuo, the residue is adsorbed on silica gel column (30 g) and eluted with cychohexane-ethyl acetate-pyridine (80:20:0.1) to afford the 5β-(oct-trans-1'-en-1'-yl)-3'S,4α-dihydroxy-cyclopent-2-enyl- 1α-ethanal-3'-THP-ether (0.55 g), which is dissolved in 20 ml of dry DMSO. Under a nitrogen atmosphere, a suspension of 0.66 g of sodium hydride (80 percent dispersion in mineral oil) in dry DMSO (22 ml) is heated with stirring at 55°–66°C, until the evolution of hydrogen is ceased. The stirred mixture, cooled to 5°–10°C is treated with triphenyl-(4-carboxybutyl)phosphonium bromide (4.93 g) in dry DMSO (15 ml); the deep orange-red solution of the ylide is then treated with the solution of the cyclopent-2-enyl-1α-ethanal mentioned above.

The mixture is stirred for an additional 18 hours at room temperature and then diluted with water (60 ml) under stirring with external cooling at 5–10°C. The aqueous phase is extracted repeatedly with ether to remove all the triphenylphosphoxide; the organic phases, after reextraction with 0.5N NaOH, are discarded. The combined aqueous alkaline phases are then acidified to pH 4.5–4.7 with 2N sulfuric acid and extracted repeatedly with ether-petane (1:1) and the combined organic extracts are washed to neutrality with saturated ammonium sulfate solution, dried (Na$_2$SO$_4$) and evaporated to dryness in vacuo to yield the 5-cis, 13-trans-11β,15S-dihydroxy-prosta-5,9,13-trienoic acid-15-THP-ether, $[\alpha]_D$= +2.1° (chloroform) (0.56 g).

EXAMPLE 24

Using the 5β-(oct-trans-1'-en-1'-yl)-3'R,4α-dihydroxy-cyclopent-2-enyl-1α-acetic acid methylester-4-p-phenylbenzoate-3'-THP-ether in the procedure of Example 22, we prepare:

5β-(oct-trans-1'-en-1'-yl)-3'R,4α-dihydroxy-cyclopent-2-enyl-1α-ethanal-3'-THP-ether and
5-cis,13-trans-11α,15R-dihydroxy-prosta-5,9,13-trienoic acid-15-THP-ether, $[\alpha]_D$= +38° (CHCl$_3$).

EXAMPLE 25

A solution of 5c,13t-11α, 15S-dihydroxy-prosta-5,9,13-trienoic acid-15-THP-ether (0.4 g) in 30 ml of acetone and 30 ml of 0.1N oxalic acid is heated for 9 hours to 36–39°C, the acetone is removed in vacuo and the aqueous phase is extracted repeatedly with ether. The combined organic phases are washed to neutrality with saturated ammonium sulfate, dried (Na$_2$SO$_4$). After removal of solvent the residue (0.34 g) is purified by column chromatography on acid washed silica (30 g) using as eluent cyclohexane-ethyl acetate (110:90), to obtain 0.176 g of pure 5c,13t-11α,15S-dihydroxy-prosta-5,9,13-trienoic acid as a colourless oil, $[\alpha]_D$= +30°, $[\alpha]_{436°}$ =+64° (ethanol).

EXAMPLE 26

Using the 5c,13t-11α,15R-dihydroxy-prosta-5,19,13-trienoic acid-15-THP-ether in the procedure of Example 25 we prepare the 5-cis,13-trans-11α,15R-dihydroxy-prosta-5,9,13-trienoic acid as a colourless oil, $[\alpha]_D$= +22.3°, $[\alpha]_{436°}$ =+47° (ethanol).

EXAMPLE 27

A stirred solution of 5β-(3'-oxo-oct-trans-1'-en-1'-yl)-4α-hydroxy-cyclopent-2-enyl-1α-acetic acid methyl ester-4-p-phenylbenzoate (2.03 g = 4.41,10$^{-3}$ moles) in 80 ml of dry ether, cooled to 0°C is treated with 8.8 ml of a solution of methylmagnesium iodide (2.53% = 22.25,10$^{-3}$ moles).

The mixture is stirred for an additional 20 minutes at 0°C and then diluted with a 25% ammonium chloride solution. The organic phase is separated and the aqueous phase is repeatedly reextracted with ether; the combined organic layers are washed to neutrality with saturated NaCl solution, dried (Na$_2$SO$_4$). After removal of solvents, the residue is adsorbed on silica gel column (80 g) and eluted with cyclohexane-ethyl acetate (90:10) to yield 1.38 g of a mixture of the 3'C, and 3'R epimeric tertiary alcohols: 5β-(3ƒ-methyl-oct-trans-1'-en-1'-yl)-3ƒ, 4α-dihydroxy-cyclopent-2-enyl-1α-acetic acid methyl ester-4-p-phenylbenzoate. By further elution with cyclohexane-ethyl acetate (65:35), 0.28 g of 5β-(3'ƒ-methyl-oct-trans-1'-en-1'-yl)-3'ƒ,4α-dihydroxy-cyclopent-2-enyl-1α-acetic acid methyl ester are obtained. The isomer pairs are optionally separated by chromatography on silica gel to yield the single isomers 5β-(3'R-methyl-oct-trans-1'-en-1'-yl)-3'S,4α-dihydroxy-cyclopent-2-enyl-1α-acetic acid methyl ester -4-p-phenylbenzoate and 5β-(3'S-methyl-oct-trans-1'-en-1'-yl)-3'R,4α-dihydroxy-cyclopent-2-enyl-1α-acetic acid methyl ester and their 4-hydroxy- derivatives.

EXAMPLE 28

Replacing the methyl magnesium iodide with ethylmagnesium bromide, propyl magnesium bromide, isopropyl magnesium bromide and vinyl magnesium bromide, respectively, in the process of Example 27 the following tertiary alcohols are obtained:

5α-(3'ƒ-ethyl-oct-trans-1'-en-1'-yl)-3'ƒ,4α-dihydroxy-cyclopent-2-enyl-1α-acetic acid methyl ester-4-p-phenylbenzoate;

5β-(3' ƒ -propyl or isopropyl-trans-1'-en-1'-yl)-3'ƒ,4α-dihydroxy-cyclopent-2-enyl-1α-acetic acid methyl ester-4-p-phenylbenzoate;

5β-(3'ƒ-vinyl-trans-1'-en-1'-yl)-3'ƒ,4α-dihydroxy-cyclopent-2-enyl-acetic acid methyl ester-4-phenylbenzoate.

The pairs of isomers are then, optionally, separated by chomatography on silica gel to yield the single 3'R-alkyl-3'S-hydroxy and 3'R-hydroxy-3'S-alkyl isomers.

EXAMPLE 29

A 7.2% DIBA solution in toluene (8 ml) is added over 15 minutes to a stirred solution of 5β-(3'ƒ-methyl-oct-1'-trans-1'-en-1'-yl)-3'ƒ,4α-dihydroxy-cyclopent-2-enyl-1α-acetic methylester-4-p-phenylbenzoate (0.47 g) [a mixture of the two 3'R-methyl-3'S-hydroxy and 3'R-hydroxy-3'S-methyl isomers] in dry toluene (18 ml), cooled at −70°.

The stirring is continued for 45 minutes, afterwards the reaction mixture is treated with 2M-isopropanol solution in toluene (20 ml), stirred for an additional 20 minutes at −60° and then warmed up to room temperature. After addition of water (2 ml), dry sodium sulphate (4 g), celite (8 g), the stirring is continued for 6 hours and then the solution is filtered. After removal of the solvents in vacuo the residue is absorbed on a silica (15 g) column and eluted with chloroform-methanol-acetic acid (75:20;5).

After washing of the eluate with 5% sodium hydrogen carbonate and water up to neutrality, drying on Na$_2$SO$_4$ and removal of solvents, the elution affords 0.245 g of 5β-(3'ƒ-methyl-oct-trans-1'-en-1'-yl)-3'ƒ,4α-dihydroxy-cyclopent-2-enyl-1α-ethanol which is dissolved in dry DMSO (18 ml).

Under a nitrogen atmosphere a stirred suspension of 610 mg of NaH (80 percent dispersion in mineral oil) in 18.5 ml of DMSO is heated for 3 hours at 55–65°C until the evolution of H$_2$ is ceased. The stirred mixture cooled to 5–8° is treated with triphenyl(4-carboxybutyl)-phosphonium bromide (4.5 g) in 13.8 ml of DMSO, the deep red solution of the ylide is then treated with the solution of the cyclopenten-2-enyl-1α-ethanal. The mixture is kept overnight under stirring, dilution with 48 ml of water and repeated extraction with ethyl ether (5 ml × 13) follow.

The combined organic phases, after extraction (2 × 4 ml) with 0.5N NaOH, are discarded.

The aqueous alkaline phases are acidified to pH 4.8–5.2 and extracted repeatedly with ethyl ether (5 × 20 ml). The combined organic phases are washed with saturated ammonium sulfate solution, dried (Na$_2$SO$_4$) and evaporated to dryness to yield 0.304 g of 5c,13t-15ƒ-methyl-11α,15ƒ-dihydroxy-prosta-5,9,13-trienoic acid.

A solution of diazomethane (1.5 equiv.) in ether is added to a solution of this product in ether (6 ml). Evaporation to dryness under vacuum after 30' yields 0.3 g of 5c,13t-15ƒ-methyl-11α,15ƒ-dihydroxy-prosta-5,9,13-trienoic acid methyl ester; this product is absorbed on a column of silica gel (60 g). The next elution with ethyl ether gives in the order: 102 mg of 5c,1-3t-15R-methyl-11α,15S-dihydroxy-prosta-5,9,13-trienoic acid methyl ester and 108 mg of 5c,13t-15S-methyl-11α,15R-dihydroxy-prosta-5,9,13-trienoic acid methyl ester.

EXAMPLE 30

According to the process disclosed in the Example 29, the reductions with DIBA of the tertiary alcohols prepared in the Example 28 yield the following cyclopent-2-enyl-1-ethanal derivatives:

5β-(3'ƒ-ethyl-oct-trans-1'-en-1'-yl)-3'ƒ,4α-hydroxy-cyclopent-2-enyl-1α-ethanal;

5β(3'ƒ-propyl-oct-trans-1'-en-1'-yl)-3'ƒ,4α-hydroxy-cyclopent-2-enyl-1α-ethanal;

5β-(3'ƒ-isopropyl-oct-trans-1'-en-1'-yl)-3'ƒ,4α-hydroxy-cyclopent-2-enyl-1α-ethanal;

5β-(3'ƒ-vinyl-oct-trans-1'-en-1'-yl)-3'ƒ,4α-hydroxy-cyclopent-2-enyl-1α-ethanal

EXAMPLE 31

According to the method disclosed in the Example 29, by reaction of the ylide, obtained starting from the triphenyl-(4-carboxybutyl) phosphonium bromide, with the cyclopent -2-enyl-ethanals prepared above, the following compounds are obtained after chromatographic separation carried out on the methyl esters:

5c,13t-15R-ethyl-11α,15S-dihydroxy-prosta-5,9,13-trienoic acid methyl ester;

5c,13t-15S-ethyl-11α,15R-dihydroxy-prosta-5,9,13-trienoic acid methyl ester;

5c,13t-15S-propyl-11α,15R-dihydroxy-prosta-5,9,13-trienoic acid methyl ester;

5c,13t-15R-propyl-11α,15S-dihydroxy-prosta-5,9,13-trienoic acid methyl ester;
5c,13t-15R-vinyl-11α,15S-dihydroxy-prosta-5,9,13-trienoic acid methyl ester;
5c,13t-15S-vinyl-11α,15R-dihydroxy-prosta-5,9,13-trienoic acid methyl ester;
5c,13t-15R-isopropyl-11α,15S-dihydroxy-prosta-5,9,13-trienoic acid methyl ester;
5c,13t-15S-isopropyl-11α,15R-dihydroxy-prosta-5,9,13-trienoic acid methyl ester;

EXAMPLE 32

0.2 ml of a 20% potassium carbonate aqueous solution is added to a solution of 37.5 mg of 5c,13t-15R-methyl-11α,15S-hydroxy-prosta-5,9,13-trienoic acid methyl ester in 3 ml of ethanol and the mixture is refluxed for 3 hours. The methanol is evaporated, the residue is diluted with water and the aqueous solution is washed with 3 ml of ethyl ether-petane (1:1). The organic phase is reextracted with 0,25N potassium hydroxide and is discarded. By acidification to pH 5 of the combined alkaline phases and subsequent reextraction with ether (3 × 5 ml), from the combined organic phases, after washing to neutrality with saturated ammonium sulfate, drying ($Na_2SO_4$) and solvent evaporation, 26 mg of pure 5c,13t-15R-methyl-11α,15S-dihydroxy-prosta-5,9,13-trienoic acid are obtained.

In the same way the following acids are prepared by saponification of the methyl esters of the Examples 29 and 31:
5c,13t-15S-methyl-11α,15R-dihydroxy-prosta-5,9,13-trienoic acid;
5c,13t-15R-ethyl-11α,15S-dihydroxy-prosta-5,9,13-trienoic acid;
5c,13t-15S-ethyl-11α,15R-dihydroxy-prosta-5,9,13-trienoic acid;
5c,13t-15S-vinyl-11α,15R-dihydroxy-prosta-5,9,13-trienoic acid;
5c,13t-15R-vinyl-11α,15S-dihydroxy-prosta-5,9,13-trienoic acid;
5c,13t-15S-isopropyl-11α,15R-dihydroxy-prosta-5,9,13-trienoic acid;
5c,13t-15R-isopropyl-11α,15S-dihydroxy-prosta-5,9,13-trienoic acid;
5c,13t-15S-propyl-11α,15R-dihydroxy-prosta-5,9,13-trienoic acid;
5c,13t-15R-propyl-11α,15S-dihydroxy-prosta-5,9,13-trienoic acid. EXAMPLE 33

A benzene solution of 1 equiv. of 5β-formyl-4α-hydroxy-cyclopent-2-enyl-1α-acetic acid methyl ester-4-p-phenyl benzoate is reacted with a suspension in benzene of the sodium salt of (3S-methyl-2-oxoheptyl)-dimethoxyphosphonate (1.15 equiv.) and using the procedure of Example 21, the following compound is obtained:
5β-(3'-oxo-4'S-methyl-oct-trans-1'-en-1'-yl)-4α-hydroxy-cyclopent-2-enyl-1α-acetic acid methyl ester-4-p-phenylbenzoate (0.85 equiv.).

In an analogous manner, starting from the following phosphonates:
dimethyl-2-oxo-(3R-methyl)-heptyl phosphonate,
dimethyl-2-oxo-(3,3-dimethyl)-heptyl phosphonate,
dimethyl-2-oxo-n-octyl phosphonate,
dimethyl-2-oxo-n-nonyl phosphonate,
the following compounds are prepared:

5β-(3'-oxo-4'R-methyl-oct-trans-1'-en-1'-yl)-4α-hydroxy-cyclopent-2-enyl-1α-acetic acid methyl ester-4-p-phenyl benzoate;
5β-(3'-oxo-4',4'-dimethyl-oct-trans-1'-en-1'-yl)-4α-hydroxy-cyclopent-2-enyl-1α-acetic acid methyl ester-4-p-phenylbenzoate;
5β-(3'-oxo-non-trans-1'-en-1'-yl)-4α-hydroxy-cylcopent-2-enyl-1α-acetic acid methyl ester-4-p-phenylbenzoate;
5β-(3'-oxo-dec-trans-1'-en-1'-yl)-4α-hydroxy-cyclopent-2-enyl-1α-acetic acid methyl ester-4-p-phenylbenzoate.

EXAMPLE 34

Following the procedure of Example 21, a solution of 1 equiv. of 5β-(3'-oxo-4'S-methyl-oct-trans-1'-en-1'-yl)-4α-hydroxy-cyclopent-2-enyl-1α-acetic acid methyl ester-4-p-phenyl benzoate in dry ether is added dropwise to a stirred 0.06 M solution of zinc borohydride (10 equiv. excess) in ether at room temperature.

After 30 minutes the excess reagent is destroyed by cautious addition of 2N sulfuric acid and from the organic phase, after washing to neutrality and solvent evaporation, a mixture of the two epimers 3'X and 3'R is obtained; the two epimers are then separated by chromatography on silica gel obtaining the 5β-(4'S-methyl-oct-trans-1'-en-1'-yl)-3'S,4α-dihydroxy-cyclopent-2-enyl-1α-acetic acid methyl ester-p-phenylbenzoate and the 5β-(4'S-methyl-oct-trans-1'-en-1'-yl)-3'R,4α-dihydroxy-cyclopent-2-enyl-1α-acetic acid methyl ester-p-phenyl benzoate, respectively.

EXAMPLE 35

Following the procedure of Examples 21 and 34, the trans-enone-derivatives prepared according to the Example 33 are subjected to reduction with 0.06M ethereal solution of zinc borohydride and the following pairs of epimeric alcohols are obtained:
a.  5β-(4'R-methyl-oct-trans-1'-en-1'-yl)-3'S,4α-dihydroxy-cyclopent-2-enyl-1α-acetic acid methyl ester-p-phenylbenzoate;
5β-(4'R-methyl-oct-trans-1'-en-1'-yl)-3'R,4α-dihydroxy-cyclopent-2-enyl-1α-acetic acid methyl ester-p-phenylbenzoate;
b.  5β-(4',4'-dimethyl-oct-trans-1'-en-1'-yl)-3'S,4α-dihydroxy-cyclopent-2-enyl-1α-acetic acid methyl ester-p-phenylbenzoate;
5β-(4',4'-dimethyl-oct-trans-1'-en-1'-yl)-3'R,4α-dihydroxy-cyclopent-2-enyl-1α-acetic acid-methyl ester-p-phenylbenzoate;
c.  5β-(non-trans-1'-en-1'-yl)-3'R,4α-dihydroxy-cyclopent-2-enyl-1α-acetic acid methyl ester-p-phenylbenzoate;
5β-(non-trans-1'-en-1'-yl)-3'S,4α-dihydroxy-cyclopent-2-enyl-1α-acetic acid methyl ester-p-phenylbenzoate;
d.  5β-(dec-trans-1'-en-1'-yl)-3'S,4'α-dihydroxy-cyclopent-2-enyl-1α-acetic acid methyl ester-p-phenylbenzoate;
5β-(dec-trans-1'-en-1'-yl)-3'R,4'α-dihydroxy-cyclopent-2-enyl-1α-acetic acid methyl ester-p-phenylbenzoate.

The single pairs of epimers are then separated to yield the pure epimers by chromatography on silica gel.

EXAMPLE 36

According to the process of the Example 29, starting from the pairs of the 3'R and 3'S epimeric alcohols 5β-(4'R-methyl-oct-trans-1'-en-1'-yl)-3'S, 4α-dihydroxy and 5β-(4'R-methyl-oct-trans-1'-en-1'-yl)-3'R, 4α-dihydroxy-cyclopent-2-enyl-1α-acetic acid methyl ester-4-p-phenyl benzoate as well as starting from the single 15S and 15R alcohols previously separated, the reduction in toluene at −70° with DIBA gives a mixture of the two epimeric alcohol-aldehydes, or the single alcohol aldehydes 5β-(4'R-methyl-oct-trans-1'-en-1'-yl)-3'S, 4α-dihydroxy-cyclopent-2-enyl-1α-ethanal;

5β-(4'R-methyl-oct-trans-1'-en-1'-yl)-3R,4α-dihydroxy-cyclopent-2-enyl-1α-ethanal.

200 mg of the mixture of the 15S and 15R alcohol-aldehydes are, optionally, adsorbed on 150 g of silica gel and, by elution with chloroform-ethanol (97,5–2,5), give the single epimeric derivatives 15S-alcohol-aldehyde and 15R-alcohol-aldehyde.

EXAMPLE 37

By a method in accordance with the proess described in the Examples 29 and 36, starting from the methyl esters of the dihydroxy-cyclopentenyl-acetic acid derivatives of Examples 35 and 36, the corresponding dihydroxy-cyclopent-2-enyl-aldehyde (pairs of epimeric alcohols and single enantiomers) are prepared by reduction with DIBA in toluene:

a. 5β-(4'S-methyl-oct-trans-1'-en-1'-yl)-3'S,4α-dihydroxy-cyclopent-2-enyl-1α-ethanal;

5β-(4'S-methyl-oct-trans-1'-en-1'-yl)-3'R,4α-dihydroxy-cyclopent-2-enyl-1α-ethanal;

b. 5β-(4',4'-dimethyl-oct-trans-1'-en-1'-yl)-3'S,4α-dihydroxy-cyclopent-2-enyl-1α-ethanal;

5β-(4',4'-dimethyl-oct-trans-1'-en-1'-yl)-3'R,4α-dihydroxy-cyclopent-2-enyl-1α-ethanal;

c. 5β-(non-trans-1'-en-1'-yl)-3'S,4α-dihydroxy-cyclopent-2-enyl-1α-ethanal;

5β-(non-trans-1'-en-1'-yl)-3'R,4α-dihydroxy-cyclopent-2-1α-ethanal;

d. 5β-(dec-trans-1'-en-1'-yl)-3'S,4α-dihydroxy-cyclopent-2-enyl-1α-ethanal;

5β-(dec-trans-1'-en-1'-yl)-3'R,4α-dihydroxy-cyclopent-2-enyl-1α-ethanal.

EXAMPLE 38

According to the process of the Example 29, by reaction with the ylide obtained from the triphenyl-(4-carboxy-butyl)-phosphonium bromide the following prostatrienoic acids, as pure enantiomers or pairs of 15R and 15S epimeric alcohols, are prepared from the aldehydes (pure enantiomers and pairs of enantiomers) obtained in Examples 36 and 37:

a. 5c,13t-16R-methyl-11α,15S-dihydroxy-prosta-5,9,13-trienoic acid;

5c,13t-16R-methyl-11α,15R-dihydroxy-prosta-5,9,13-trienoic acid;

b. 5c,13t,-16S-methyl-11α,15S-dihydroxy-prosta-5,9,13-trienoic acid;

5c,13t-16S-methyl-11α,15R-dihydroxy-prosta-5,9,13-trienoic acid;

c. 5c,13t-16,16-dimethyl-11α,15S-dihydroxy-prosta-5,9,13-trienoic acid;

5c,13t,-16,16-dimethyl-11α,15R-dihydroxy-prosta-5,9,13-trienoic acid;

d. 5c,13t-11α,15S-dihydroxy-20ω-homo-prosta-5,9,13-trienoic acid;

5c,13t-11α,15R-dihydroxy-20ω-homo-prosta-5,9,13-trienoic acid;

e. 5c,13t-11α,15S-dihydroxy-20ω-dihomo-prosta-5,9,13-trienoic acid;

5c,13t-11α,15R-dihydroxy-20ω-dihomo-prosta-5,9,13-trienoic acid which are then converted, optionally, to methyl ester derivatives thereof with diazomethane.

EXAMPLE 39

According to the procedure described in the Example 29, a pair of the epimeric 15R- and 15S-prostatrienoic acid methyl esters prepared by the method of the Example 38, is subjected to a chromatographic separation on silica gel to give the single 15S- and 15R- epimeric prostanoic acids. These single epimers are then, optionally, saponified by the process of Example 32, yielding the corresponding free carboxylic acid.

EXAMPLE 40

A solution of 0,21 g of 5c,13t-11α,15S-dihydroxy-prosta-5,9,13-trienoic acid-15-THP ether in pyridine is treated with 0,12 ml of acetic anhydride and maintained overnight at room temperature. The solution id diluted with water, acidified to pH 4,5-4,7 and extracted with ethyl ether. From the organic phases, after drying and solvent evaporation, 0,21g of 5c,13t-11α,15S-dihydroxy-prosta-5,9,13-trienoic acid-11α-acetate-15-THP ether is obtained and is dissolved in 15 ml of acetone and 10 ml of 0,2N oxalic acid. The solution is maintained for 9 hours at 38°–40°C, concentrated under vacuum to remove the acetone and extracted with ethyl ether. From the organic phases, after washing with saturated ammonium sulfate, and drying over $Na_2SO_4$, by solvent evaporation there is obtained a residue which is adsorbed on 12g of acid washed silica gel. By elution with cyclohexane-ethyl ether (6:4) and solvent evaporation 0,154 g of 5c,13t-11α,15S-dihydroxy-prosta-5,9,13-trienoic acid-11α-acetate are obtained.

EXAMPLE 41

A solution of 1 equiv. of 5β-(3'-oxo-non-trans-1'-en-1'-yl)-4α-hydroxy-cyclopent-2-enyl-1α-acetic acid methyl ester-4-p-phenylbenzoate in anhydrous ethyl ether is reacted, according to the procedure of Example 27, with 5 equiv. of methyl magnesium bromide at 0°, to give a mixture of the two tertiary epimeric alcohols, 5β-(3'ſ-methyl-non-trans-1'-en-1'-yl)-3'ſ,4α-dihydroxy-cyclopent-2-enyl-1α-acetic acid methyl ester-4-phenylbenzoate, which optionally is separated by column chromatography on silica gel obtaining the single alcohols 3'R-methyl-3'S-hydroxy and 3'R-hydroxy-3'S-methyl.

The mixture of the alcohols (as the single epimers) is then reacted in toluene with DIBA to yield a 5β-(3'ſ-methyl-non-trans-1'-en-1'-yl)-3'ſ,4α-dihydroxy-cyclopent-2-enyl-1α-ethanal which is then reacted by the method of Example 29 with the triphenyl-(4-carboxy-butyl)phosphonium bromide in DMSO in the presence of methyl sulfinyl carbanion to give a 5β-(3'ſ-methyl-non-trans-1'-en-1'-yl)---yl)-3ſ,4α-dihydroxy-cyclopent-2-enyl-1α-(6''-carboxy-es-cis-2''-en-1''-yl) compound.

This compound is then converted to its methyl ester by treatment with diazomethane and after chromatographic separation on silica gel there is obtained in the order:

5c,13t-11α,15S-dihydroxy-15R-methyl-20ω-homo-prosta-5,9,13-trienoic acid methyl ester;

5c,13t-11α,15R-dihydroxy-15S-methyl-20ω-homo-prosta-5,9,13-trienoic acid methyl ester which according to the procedure of Example 32 are then saponified to yield the corresponding free acids.

EXAMPLE 42

Using the 5β-(3'-oxo-dec-trans-1'-en-1'-yl)-4060 -hydroxy-cyclopent-2-enyl-1α-acetic acid methyl ester-4-p-phenyl benzoate in the procedure of Example 41 the following acids are obtained: 4α

5c, 13t-15R-methyl-11α,15S-dihydroxy-20ω-dihomo-prosta-5,9,13-trienoic acid;

5c,13t-15S-methyl-11α,15R-dihydroxy-20ω-dihomo-prosta-5,9,13-trienoic acid, and their methyl esters.

EXAMPLE 43

Under a nitrogen atmosphere a stirred suspension of 0.66 g of NaH (80 percent dispersion in mineral oil) in 22 ml of anhydrous DMSO is heated for 3 hours to 55°–66°C until the evolution of $H_2$ is ceased. The stirred mixture, cooled to 8°–10°C is treated with a solution of cis-(4-carboxy-but-3-en-1-yl)-triphenylphosphonium bromide (4.85 g) in dry DMSO (15 ml); the deep orange-red solution of the ylide is then treated with a solution of 5β-(oct-trans-1'-en-1'-yl)-3'S,4α-dihydroxy-cyclopent-2-enyl-1α-ethanal (0.50 g) in 15 ml of DMSO. The mixture is stirred for 8 hours at room temperature, diluted with water, and washed with ethyl ether to extract all the triphenylphosphoxide. The aqueous phase is acidified to pH 4.5–4.8, extracted with ethyl ether and these ethereal extracts after washing to neutrality with saturated $(NH_4)_2SO_4$ solution are evaporated to dryness. The residue is purified by elution with cyclohexane-ethyl acetate (3:7), after adsorption on acid silica gel, to afford 0.48 g of 2c,5c,13t-11α,15S-dihydroxy-prosta-2,5,9,13-tetraenoic acid.

EXAMPLE 44

Following the procedure of Example 21, one equivalent 5β-hydroxymethyl-4α-hydroxy-cyclopent-2-enyl-1α-acetic acid methyl ester-4-propionate (1equiv.) is treated with the pyridine-chromic anhydride complex in dry methylene chloride to yield the 5-formyl-4-hydroxy-cyclopent-2-enyl-1α-acetic acid methyl ester-4-propionate.

This compound is then reacted in benzene with 1.2 molar equiv. of the (2-oxo-heptyl)-dimethoxyphosphonate obtaining the 5β-(3'-oxo-oct-trans-1'-en-1'-yl)-4α-hydroxy-cyclopent-2-enyl-1α-acetic acid methyl ester-4-propionate.

A solution of this product (1equiv.) in dry ether is added dropwise to a stirred zinc borohydride solution in ether (8 equiv.), obtaining a mixture (≈1:1) of the two epimeric alcohols (3'S and 3'R): 5β-(oct-trans-1'-en-1'-yl)-3'ʃ,4α-dihydroxy-cyclopent-2-enyl-1α-acetic acid methyl ester-4-propionate.

A stirred solution of 5β-(oct-trans-1'-en-1'-yl)-3'ʃ ,4α-dihydroxy-cyclopent-2-enyl-1α-acetic acid methyl ester-4-propionate (0.42 g, mixture ≈1:1 of the two epimeric alcohols 3'S and 3'R) in dry toluene (18 ml), cooled at −70°, is treated over 10 minutes with a 0.5M solution of DIBA in toluene (8 ml). The mixture is stirred for an additional 30 minutes at −70° and then treated with a 2M isopropanol solution in toluene (20 ml). After 15 minutes, the mixture is warmed up to room temperature, treated with water (2 ml), sodium sulphate (4g) and celite (8 g) and then stirred for 6 hours. After filtration and washing with toluene, the eluate es evaporated to dryness in vacuo to yield 0.32 g of 5β-(oct-trans-1'-en-1'-yl)-3',4α-dihydroxy-cyclopent-2-enyl-1α-ethanal (a mixture of the two epimeric alcohol-aldehydes 3'R and 3'S) which optionally is separated to give the single epimers:

5β-(oct-trans-1'-en-1'-yl)-3'S,4α-dihydroxy-cyclopent-2-enyl-1α-ethanal;

5β-(oct-trans-1'-en-1'-yl)-3'R,4α-dihydroxy-cyclopent-2-enyl-1α-ethanal.

EXAMPLE 45

A suspension in DMSO of 12 equivalents of methylsulfinylcarbanion, prepared by the procedure of Example 43, is reacted at 8°–10°C with a solution in DMSO of triphenyl-(carboxy-methoxyethyl)-phosphonium bromide, [HOOC—$CH_2$—O—CH$_2$—$CH_2$—P-$(C_6H_5)_3$Br—], (6 equiv.) to give the corresponding ylide.

To this solution is then added a solution of 1 equiv. of 5β-(oct-trans-1'-en-1'-yl)-3'ʃ,4α-dihydroxy-cyclopent-2-enyl-1-ethanal and the mixture is stirred at room temperature for 12 hours. After dilution with water and extraction with ethyl ether to remove the triphenylphosphoxide, the aqueous phase is acidified to ph 4.5–4.8 and extracted with ether. These organic extracts are combined, washed to neutrality with a saturated $(NH_4)_2SO_4$ solution, dried $(Na_2SO_4)$ and evaporated to dryness to give a mixture of the epimeric derivatives:

5C,13t-11α,15S-dihydroxy-3-oxa-prosta-5,9,13-trienoic acid;

5c,13t-11α,15R-dihydroxy-3-oxa-prosta-5,9,13-trienoic acid; which are then separated by column chromatography on acid washed silica gel using cyclohexane-ethyl acetate (4:6) as eluent.

EXAMPLE 46

By starting with one of the cyclopent-2-enyl-1α-ethanal derivatives whose preparation is disclosed in Examples 36, 37 and 44, the compounds below are obtained by reaction with an ylide produced from cis-triphenyl-(4-carboxy-but-3-en-1-yl)-phosphonium bromide, trans-triphenyl-(4-carboxy-but-3-en-1-yl)-phosphonium bromide, triphenyl-(4-carboxy-but-3yn-1-yl)-phosphonium bromide, triphenyl-(carboxy-methoxyethyl)-phosphonium bromide, and following the procedure of Examples 43 and 45:

2c,5c,13t-11α,15R-dihydroxy-prosta-2,5,9,13-tetraenoic acid;

2t,5c,13t-11α,15S-dihydroxy-prosta-2,5,9,13-tetraenoic acid;

2t,5c,13t-11α,15R-dihydroxy-prosta-2,5,9,13-tetraenoic acid;

5c,13t,-11α,15R-dihydroxy-prosta-2-yn-5,9,13-trienoic acid;

5c,13t-11α,15S-dihydroxy-prosta-2-yn-5,9,13-trienoic acid;

5c,13t-16,16-dimethyl-11α,15S-dihydroxy-3-oxa-prosta-5,9,13-trienoic acid;

5c,13t-16,16-dimethyl-11α,15R-dihydroxy-3-oxa-
prosta-5,9,13-trienoic acid;
5c,13t-16R-methyl-11α,15S-dihydroxy-3-oxa-
prosta-5,9,13-trienoic acid;
5c,13t-16S-methyl-11α,15S-dihydroxy-3-oxa-prosta-
5,9,13-trienoic acid;
5c,13t-16R-methyl-11α,15R-dihydroxy-3-oxa-
prosta-5,9,13-trienoic acid;
5c,13t-16-S-methyl-11α,15R-dihydroxy-3-oxa-
prosta-5,9,13-trienoic acid;
5c,13t-11α,15S-dihydroxy-3-oxa-20ω-homo-prosta-
5,9,13-trienoic acid;
5c,13t-11α,15S-dihydroxy-3-oxa-20ω-dihomo-
prosta-5,9,13-trienoic acid;
5c,13t-11α,15R-dihydroxy-3-oxa-20ω-homo-prosta-
5,9,13-trienoic acid;
5c,13t-11α,15R-dihydroxy-3-oxa-20ω-dihomo-
prosta-5,9,13-trienoic acid which are then converted to their methyl ester by reaction with diazomethane.

EXAMPLE 47

0,9 ml of n-octanol and 0,5g of dicyclohexyl carbodiimide is added to a solution of 0,5 g of 5c,13t-15R-methyl-prosta-5,9,13-trien-11α,15S-dioloic acid in 0,8 ml of pyridine and 28 ml of methylene chloride. After three hours the mixture is adsorbed on a column of silica gel and eluted with cyclohexane-ethyl ether (80:20) obtaining pure 5c,13t-15R-methyl-11α,15S-dihydroxy-prosta-5,9,13-trienoic acid octyl ester.

In the same manner, by starting from the corresponding 11α,15 ʃ-dihydroxy-prostatrienoic acids described in Examples 25,26,32,38,39,41,42,43,45 and 46 and reacting with a suitable alcohol, the corresponding n-hexyl, n-octyl, n-heptyl, decyl and dodecyl esters are prepared.

EXAMPLE 48

2,1g of p-toluene-sulfonyl chloride are added, while cooling, to about 0°–5°C, to a solution of 0,8g of 5c,13-t-16R-methyl-11α,15R-dihydroxy-prosta-5,9,13-triene-1-oic acid methyl ester in pyridine. The mixture is stirred overnight at room temperature, diluted with a 10% citric acid solution and extracted repeatedly with ether. The organic phases washed to neutrality are dried ($Na_2SO_4$) and evaporated to dryness in vacuo to give 5c,13t-16R-methyl-prosta-5,9,13-triene-11α,15R-dihydroxy-1-oic acid methyl ester-11,15p-toluensulfonate; a solution of this product in dry ether is added to a refluxing suspension of $LiAlH_4$ in tetrahydrofuran. The mixture is refluxed for 6 hours and after cooling the excess reagent is destroyed with moist ether. After addition of celite and anhydrous sodium sulfate the mixture is filtered and the eluate is evaporated to dryness. The residue is purified by adsorption on silica gel and elution with chloroform obtaining the 5c,13-trans-1-hydroxy-16R-methyl-prosta-5,9,13-triene.

EXAMPLE 49

By operating in conformance with Example 47 and starting from the corresponding esters, the following compounds are prepared by conversion to the corresponding 11α, 15-di-p-toluensulfonates and subsequent reduction with lithium aluminum hydride:

5c,13t-1-hydroxy-16S-methyl-prosta-5,9,13-triene;
5c,13t-1-hydroxy-16,16-methyl-prosta-5,9,13-triene;
5c,13t-1-hydroxy-20ω-dihomo-prosta-5,9,13-triene.

EXAMPLE 50

0.62 ml of a solution of Jones' reagent are added all at once to a solution (0.4 g) of 5c,13t-1-hydroxy-16,16-dimethyl-prosta-5,9,13-triene in acetone (50 ml) cooled to −5°C; the mixture is stirred for one additional hour. After dilution with 300 ml of a mixture ether-dichloromethane (5:1), the organic phase is washed with 30 ml of saturated NaCl solution, then with 30 and 12 ml of a solution of 10.5 g of potassium iodide and 10.5 g of sodium thiosulfate in 60 ml of water: these aqueous phases are discarded.

The organic phase is 5 times washed with 25 ml of $NaHCO_3$ saturated solution and then with 25 ml of saturated NaCl solution.

These alkaline phases are combined, acidified to pH 4.5–4.8 and then reextracted with ethyl ether. These ethereal extracts are washed to neutrality with ammonium sulfate saturated solution, dried and evaporated to dryness to yield the 5c,13t-16,16-dimethyl-prosta-5,9,13-trien-1-oic acid.

EXAMPLE 51

A solution of 5β-hydromethyl-4α-hydroxy-cyclopent-2-enyl-1α-acetic acid methylester-4-acetate (2.29 g) in dry benzene (50 ml) is heated with 2,3-dihydropyran (1.45 ml) and a solution of p-toluensulfonic acid (20 mg) in benzene (40 ml). After 3 hours at room temperature, the reaction mixture is diluted with 7% potassium hydrogencarbonate solution; the organic phase is washed to neutrality, dried ($Na_2SO_4$) and evaporated to dryness in vacuo to afford the crude 5β-(hydroxymethyl-THP-ether)-4α-hydroxy-cyclopent-2-enyl-1α-acetic acid methyl ester-4-acetate (3.4 g).

A stirred solution of this crude product in dry toluene (80 ml), cooled at −60°, is treated over 10 minutes with a 0.5M solution of DIBA in toluene (60 ml). The mixture is stirred for an additional 20 minutes at −60° and then treated with a 2M-isopropanol solution in toluene (80 ml). After 15 minutes, the reaction mixture is warmed up to room temperature, treated with water (8 ml), sodium sulphate (16 g) and celite (25 g) and then stirred for 4 hours. After filtration and washing with toluene, the eluate is evaporated to dryness in vacuo to afford a crude 5β-(hydroxymethyl-THP-ether)-4α-hydroxy-cyclopent-2-enyl-1α-ethanal.

Under a nitrogen atmosphere, a stirred suspension of 2.88 g of sodium hydride (80 percent dispersion in mineral oil) in dry DMSO (96 ml) is heated at 55°–66°, until the evolution of hydrogen is ceased. The stirred mixture, cooled to 5°–10°C, is treated with triphenyl-(4-carboxybutyl)-phosphonium bromide (26.7 g) in dry DMSO (75 ml); the deep orange-red solution of the ylide is then treated with the solution of the crude 5β-(hydroxy-methyl-THP-ether)-4α-hydroxy-cyclopent-2-enyl-1α-ethanol, above mentioned, in dry DMSO (25 ml). The mixture is stirred for an additional 18 hours at room temperature and then diluted with water (200 ml) with external cooling. The aqueous phase is extracted repeatedly with ether to remove all the triphenyl phosphoxide; these organic phases are combined and discarded after re-extraction with 0.5N NaOH. The combined aqueous alkaline phases are then acidified to pH 4.5–4.7 with 2N sulphuric acid and repeatedly extracted with ether-pentane (2:1).

The combined organic extracts are washed to neutrality with saturated ammonium sulphate solution, dried (Na$_2$SO$_4$) and evaporated to dryness in vacuo to afford 5β-(hydroxymethyl-THP-ether)-4α-hydroxy-cyclopent-2-enyl-1α-(7'-hept-5'-cis-enyl-1'-oic acid) (2.78 g). By reaction of a solution of this compound in ether with an ethereal solution of diazomethane in ether we prepare the corresponding methyl ester (2.79 g) which is dissolved in dry pyridine (6 ml) and treated with acetic anhydride (2.4 ml) to afford, after working up in usual way, the 5β-(hydroxymethyl-THP-ether)-4α-hydroxy-cyclopent-2-enyl-1α-(7'-hept-5'-cis-enyl-1'-oic acid)-4-acetate (2.82 g).

A solution of this compound in acetone (80 ml) and 0.1 N oxalic acid (60 ml) is refluxed for 2 hours, the acetone is removed in vacuo and the aqueous phase is repeatedly extracted with ether.

The combined organic phases are washed up to neutrality, dried on sodium sulphate, and evaporated to dryness in vacuo. The crude product (2.6 g) is absorbed on silica gel (52 g) column; elution with cyclohexane-ethyl acetate (80:20) affords pure 5β-hydroxy-methyl-4αhydroxy-cyclopent-2-enyl-1α-(7'-hept-5'-cis-enyl-1'-oic acid)-4-acetate.

Following the same procedure, using p-phenyl-benzoylchloride as well as propionic anhydride instead of acetic anhydride, we prepare respectively:

5β-hydroxymethyl-4α-hydroxy-cyclopent-2-enyl-1α-(7'-hept-5'-cis-enyl-1'-oic acid)-4-p-phenylbenzoate;

5β-hydroxymethyl-4α-hydroxy-cyclopent-2-enyl-1α-(7'-hept-5'-cis-enyl-1'-oic acid)-4-propionate.

We claim:
1. 9-desoxy-prosta-5,9(10), 13-trienoic acid derivatives having the general formula (1)

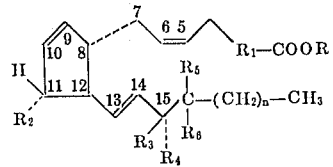

and the racemates thereof, wherein R is a hydrogen atom, a pharmaceutically acceptable cation or a C$_{1-12}$ alkyl group; R$_1$ is —CH$_2$—CH$_2$—, or —OCH$_2$—, R$_2$ is a hydroxy group or an alkanoyloxy group; one of R$_3$ and R$_4$ is a hydroxy group and the other is a hydrogen atom or a C$_{1-6}$ alkyl; R$_5$ and R$_6$, which may be the same or different, are a hydrogen atom or a C$_{1-4}$ alkyl group; n is 3, 4 or 5.

2. A compound selected from the group consisting of:
5c,13t-11α,15S-dihydroxy-prosta-5,9,13-trienoic acid;
5c,13t-11α,15S-dihydroxy-16R-methyl-prosta-5,9,13-trienoic acid;
5c,13t-11α,15S-dihydroxy-16S-methyl-prosta-5,9,13-trienoic acid;
5c,13t-11α,15S-dihydroxy-16,16-dimethyl-prosta-5,9,13-trienoic acid;
5c,13t-11α,15S-dihydroxy-20ω-homo-prosta-5,9,13-trienoic acid;
5c,13t-11α-dihydroxy-20ω-dihomo-prosta-5,9,13-trienoic acid; 5c,13t-11α,15S-dihydroxy-15R-methyl-prosta-5,9,13-trienoic acid;
5c,13t-11α,15R-dihydroxy-prosta-5,9,13-trienoic acid;
5c,13t-11α,15R-dihydroxy-16R-methyl-prosta-5,9,13-trienoic acid;
5c,13t-11α,15R-dihydroxy-16S-methyl-prosta-5,9,13-trienoic acid;
5c,13t-11α,15R-dihydroxy-16,16-dimethyl-prosta-5,9,13-trienoic acid;
5c,13t-11α,15R-dihydroxy-20ω-homo-prosta-5,9,13-trienoic acid;
5c,13t-11α,15R-dihydroxy-20ω-dihomo-prosta-5,9,13-trienoic acid;
5c,13t-11α,15R-dihydroxy-15S-methyl-prosta-5,9,13-trienoic acid;
5c,13t-11α,15S-dihydroxy-16S-isopropyl-prosta-5,9,13-trienoic acid;
5c,13t-11α,15R-dihydroxy-16R-isopropyl-prosta-5,9,13-trienoic acid;
5c,13t-11α,15S-dihydroxy-3-oxa-prosta-5,9,13-trienoic acid;
5c,13t-11α,15S-dihydroxy-16,16-dimethyl-3-oxa-prosta-5,9,13-trienoic acid;
5c,13t-11α,15R-dihydroxy-3-oxa-prosta-5,9,13-trienoic acid;
5c,13t-11α,15R-dihydroxy-16,16-dimethyl-3-oxa-prosta-5,9,13-trienoic acid;
either as free acids or as their methylesters.

3. Derivatives of claim 1, wherein R$_2$ is a hydroxy group, one of R$_3$ and R$_4$ is a hydroxy group and the other is a hydrogen atom, and R$_5$ and R$_6$ are hydrogen atoms.

4. Compound of claim 2, wherein said compound is 5c,13t-11a,15S-dihydroxy-15R-methyl-prosta-5,9,13-trienoic acid.

* * * * *